(12) United States Patent
Guo

(10) Patent No.: US 12,526,097 B2
(45) Date of Patent: Jan. 13, 2026

(54) METHOD, TERMINAL DEVICE AND NETWORK DEVICE FOR PHYSICAL UPLINK SHARED CHANNEL TRANSMISSION

(71) Applicant: GUANGDONG OPPO MOBILE TELECOMMUNICATIONS CORP., LTD., Guangdong (CN)

(72) Inventor: Li Guo, Allen, TX (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 818 days.

(21) Appl. No.: 17/860,479

(22) Filed: Jul. 8, 2022

(65) Prior Publication Data

US 2022/0345272 A1    Oct. 27, 2022

Related U.S. Application Data

(63) Continuation of application No. PCT/CN2021/072165, filed on Jan. 15, 2021.
(Continued)

(51) Int. Cl.
*H04L 5/00* (2006.01)
*H04W 72/20* (2023.01)

(52) U.S. Cl.
CPC .......... *H04L 5/0048* (2013.01); *H04W 72/20* (2023.01)

(58) Field of Classification Search
CPC ..... H04L 5/0048; H04L 5/001; H04L 5/0012; H04L 5/0026; H04L 5/0023;
(Continued)

(56) References Cited

U.S. PATENT DOCUMENTS

2019/0045494 A1    2/2019 Ho et al.
2019/0166615 A1*   5/2019 Nimbalker ............ H04W 72/21
(Continued)

FOREIGN PATENT DOCUMENTS

CN    109315009 A    2/2019
CN    109391297 A    2/2019
(Continued)

OTHER PUBLICATIONS

Samsung: "On Beam Management, Measurement and Reporting", 3GPP Draft; R1-1720290_V1, Nov. 17, 2017 (Nov. 17, 2017), pp. 1-15, XP051368939. 15 pages.
(Continued)

*Primary Examiner* — Abdullahi E Salad
(74) *Attorney, Agent, or Firm* — PERKINS COIE LLP

(57) ABSTRACT

A method for transmitting on a physical uplink shared channel, PUSCH is provided. The method comprising: receiving, by a terminal device, configuration information including M transmission configuration indication, TCI, states; receiving, by the terminal device, an activation command to activate K of the M TCI states; receiving, by the terminal device, downlink control information, DCI, to schedule a PUSCH transmission, the DCI indicating a selected TCI state from among the K TCI states; determining, by the terminal device, a spatial domain transmission filter using the selected TCI state; and transmitting, by the terminal device, on the PUSCH according to the determined spatial domain transmission filter.

18 Claims, 16 Drawing Sheets

Related U.S. Application Data

(60) Provisional application No. 62/967,862, filed on Jan. 30, 2020, provisional application No. 62/961,393, filed on Jan. 15, 2020.

(58) Field of Classification Search
CPC .... H04L 5/0044; H04L 5/0091; H04W 72/20; H04W 52/325; H04W 52/146; H04B 7/0404; H04B 7/0456; H04B 7/0695
See application file for complete search history.

(56) References Cited

U.S. PATENT DOCUMENTS

| | | | |
|---|---|---|---|
| 2019/0320469 A1 | 10/2019 | Huang et al. | |
| 2019/0373450 A1 | 12/2019 | Zhou et al. | |
| 2020/0107352 A1* | 4/2020 | Tsai | H04B 7/0617 |
| 2020/0383096 A1 | 12/2020 | Yang et al. | |
| 2021/0068058 A1* | 3/2021 | Sun | H04W 52/14 |
| 2022/0131668 A1* | 4/2022 | Matsumura | H04L 5/0023 |
| 2022/0225120 A1* | 7/2022 | Matsumura | H04L 5/0023 |
| 2022/0345283 A1* | 10/2022 | Matsumura | H04L 5/0094 |

FOREIGN PATENT DOCUMENTS

| | | |
|---|---|---|
| CN | 109802787 A | 5/2019 |
| CN | 109983823 A | 7/2019 |
| WO | 2019236197 A1 | 12/2019 |

OTHER PUBLICATIONS

LG Electronics: "Feature lead summary#3 of Enhancements on Multi-beam Operations", 3GPP Draft; R1-1907860 R1#97, FL_SUMMARY#3_MULTIBEAM (MB1), vol. RAN WG1, no. Reno, USA; May 13, 2019-May 17, 2019May 17, 2019 (May 17, 2019), XP051740132. 35 pages.

Samsung: "MAC CE design for support of multiple beam indication for single PDCCH-based multiple TRPs", vol. RAN WG2, no. Chongqing, China; Oct. 14, 2019-Oct. 18, 2019Oct. 4, 2019 (Oct. 4, 2019), XP051804519. 7 pages.

Supplementary European Search Report in the European application No. 21741237.8, mailed on May 8, 2023. 10 pages.

Samsung, "Enhancements on multi-beam operations", 3GPP TSG RAN WG1 Meeting #95 R1-1813004, Spokane, USA, Nov. 12-16, 2018.

Vivo, "Maintenance for beam management", 3GPP TSG RAN WG1 #94b R1-1810366, Chengdu, China, Oct. 8- Oct. 12, 2018.

International Search Report in the international application No. PCT/CN2021/072165, mailed on Apr. 15, 2021.

Written Opinion of the International Search Authority in the international application No. PCT/CN2021/072165, mailed on Apr. 15, 2021.

"3rd Generation Partnership Project; Technical Specification Group Radio Access Network; NR; Physical channels and modulation (Release 15)", 3GPP TS 38.211 V15.5.0 (Mar. 2019).

"3rd Generation Partnership Project; Technical Specification Group Radio Access Network; NR; Multiplexing and channel coding (Release 15)", 3GPP TS 38.212 V15.5.0 (Mar. 2019).

"3rd Generation Partnership Project; Technical Specification Group Radio Access Network; NR; Physical layer procedures for control (Release 15)", 3GPP TS 38.213 V15.5.0 (Mar. 2019).

"3rd Generation Partnership Project; Technical Specification Group Radio Access Network; NR; Physical layer procedures for data (Release 15)", 3GPP TS 38.214 V15.5.0 (Mar. 2019).

"3rd Generation Partnership Project; Technical Specification Group Radio Access Network; NR; Physical layer measurements (Release 15)", 3GPP TS 38.215 V15.5.0 (Jun. 2019).

"3rd Generation Partnership Project; Technical Specification Group Radio Access Network; NR; Medium Access Control (MAC) protocol specification (Release 15)", 3GPP TS 38.321 V15.5.0 (Mar. 2019).

"3rd Generation Partnership Project; Technical Specification Group Radio Access Network; NR; Radio Resource Control (RRC) protocol specification (Release 15)", 3GPP TS 38.331 V15.5.0 (Mar. 2019).

Ericsson, "On beam indication, measurement, and reporting", 3GPP TSG-RAN WG1 NR Ad Hoc #3 R1-1716350, Nagoya, Japan, Sep. 18-21, 2017.

Fraunhofer Iis et al., "Enhancements on UE multi-beam operation", 3GPP TSG RAN WG1 Meeting #97 R1-1910432, Chongqing, China Aug. 14-20, 2019.

International Search Report in the international application No. PCT/CN2021/072192, mailed on Mar. 8, 2021.

Written Opinion of the International Search Authority in the international application No. PCT/CN2021/072192, mailed on Mar. 8, 2021.

First Office Action of the European application No. 21741237.8, issued on Apr. 11, 2024. 8 pages.

* cited by examiner

METHOD, TERMINAL DEVICE AND NETWORK DEVICE FOR PHYSICAL UPLINK SHARED CHANNEL TRANSMISSION

CROSS-REFERENCE TO RELATED APPLICATIONS

This is a continuation of International Application No. PCT/CN2021/072165 filed on Jan. 15, 2021, which claims priority to and the benefit of U.S. Patent Application No. 62/961,393 filed on 15 Jan. 2020, and U.S. Patent Application No. 62/967,862 filed on 30 Jan. 2020. The entire contents of these applications are incorporated herein by reference in their entireties.

TECHNICAL FIELD

The present application relates to the field of communications, and more particularly to a method, terminal device, and network device for a physical uplink shared channel (PUSCH) transmission.

BACKGROUND

The 5G (fifth-generation) wireless systems can include a multi-beam based systems in the Frequency Range FR2, where multiplex transmit (Tx) and receive (Rx) analog beams are employed by a network device (e.g. a base station such as a gNB) and/or a terminal device (e.g. a user equipment (UE)) to combat the large path loss in a high frequency band. In a high frequency band system, for example mmWave systems, the network device and the terminal device are deployed with a large number of antennas so that large gain beamforming can be used to defeat the large path loss and signal blockage. Due to the hardware limitation and cost, the network device and the terminal device might only be equipped with a limited number of transmission and reception units (TXRUs). Therefore, hybrid beamforming mechanisms can be utilized in both the network device and terminal device. To get the best link quality between the network device and the terminal device, the network device and the terminal device need to align the analog beam directions for a particular downlink or uplink transmission. For downlink transmission, they need find the best optimum of network device Tx beam and terminal device Rx beam while for uplink transmission, they need to find the best pair of terminal device Tx beam and network device Rx beam.

For the communication between one terminal device and a network device, the terminal device and the network device need to determine which Tx and Rx beam are going to be used. When one terminal device moves, the beams used by the network device and the terminal device for communication might change.

In the third generation partnership project (3GPP) 5G NR release 15 specifications, the following functions are defined to support such multi-beam-based operation: beam measurement and reporting, beam indication and beam switch.

In the current design of 5G NR release 15, for PUSCH transmission, the network device may first configure a set of sounding reference signal (SRS) resources that is dedicated for that PUSCH transmission to the terminal device. The usage of that set of SRS resources can be set to be 'codebook' or 'non-codebook'. To schedule a PUSCH transmission, the network device can send one downlink control information (DCI) format to the terminal device and in the DCI format, a bit-field SRS resource indicator (SRI) is used to indicate one or more SRS resources from that SRS resource set dedicated for PUSCH transmission. For the terminal device to determine the Tx beam for that PUSCH, the terminal device may derive it based on the Tx beam information configured to the SRS resource dedicated for PUSCH transmission. If the network device needs to change the Tx beam for PUSCH transmission, the network device would have to use higher layer signalling to change the Tx beam configuration of those SRS resources dedicated for PUSCH transmission. The Tx beam configured to the SRS resources dedicated for PUSCH transmission can be an SRS resource, a channel state information reference signal (CSI-RS) resource or a signal/physical broadcast channel (SS/PBCH) block.

For codebook-based PUSCH transmission, the terminal device is configured via RRC with an SRS resource set with usage set to 'codebook', which is dedicated for codebook-based transmission. That SRS resource set can contain one or two SRS resources (e.g. SRS resource #a, #b). Each SRS resource is configured with a parameter SpatialRelationInfo that contains a reference signal ID (e.g. CSI-RS or SS/PBCH or SRS) to provide a reference for spatial relation information. For one PUSCH transmission, the network device indicates one SRS resource (e.g. SRS resource #a or SRS resource #b) from the SRS resource set to the terminal device and the terminal device derives a Tx beam for the PUSCH based on the SpatialRelationInfo configured to the indicated SRS resource. For example, a network device may indicate SRS resource #a for PUSCH transmission and the terminal device may use the CSI-RS or SS/PBCH or SRS source that is configured as spatial relation information reference to the SRS resource #a as the Tx beam for PUSCH transmission.

The Tx beam indication method for non-codebook-based PUSCH is similar to that of codebook-based PUSCH. In this case, the terminal device is configured via RRC with an SRS resource set with usage set to 'non-codebook', which is dedicated for non-codebook-based transmission. That SRS resource set can contain up to four SRS resources (e.g. SRS resources #a, #b, #c, #d), with each SRS resource being configured with a parameter SpatialRelationInfo that contains a reference signal ID (e.g. CSI-RS or SS/PBCH or SRS) to provide a reference for spatial relation information. As for codebook, for non-codebook PUSCH transmission, the network device indicates one SRS resource (e.g. out of SRS resources #a, #b, #c or #d) from the SRS resource set to the terminal device and the terminal device derives a Tx beam for the PUSCH based on the SpatialRelationInfo configured to the indicated SRS resource.

The codebook or non-codebook transmission scheme may be configured through RRC parameter. For codebook based transmission, the PUSCH transmission can be scheduled by a DCI (e.g. DCI format 0_1) and if the PUSCH transmission is scheduled by DCI format 1_0, the UE determines PUSCH transmission precoder based on SRI, TPMI and transmission rank, where the SRI, TPMI and transmission rank are given by DCI fields of SRS resource indicator and Precoding information and number of layers. The TPMI is used to indicate the precoder to be applied over the layers {0 . . . v−1} and that corresponds to the SRS resource selected by SRI when multiple SRS resources are configured in the SRS resource set for codebook based transmission, or if a single SRS resource is configured, TPMI is used to indicate the precoder to be applied over the layers {0 . . . v−1} and that corresponds to the SRS resource.

For non-codebook based transmission, the PUSCH transmission can be scheduled by DCI (e.g. format 0_1) and if the PUSCH transmission is scheduled by DCI format 0_1, the UE determines precoder and transmission rank based on the SRI when multiple SRS resources are configured in the SRS resource set non-codebook based transmission, where SRI is given by the SRS resource indicator in the DCI. The UE may perform one-to-one mapping from the indicated SRI(s) to the indicated Demodulation Reference Signal (DM-RS) port(s) and their corresponding PUSCH layers {0 . . . v−1} given by DCI format 0_1. For non-codebook-based transmission, the UE can calculate the precoder used for the transmission of SRS based on measurement of an associated NZP CSI-RS resource.

SUMMARY

Embodiments of the present application provide a method, terminal device, and a network device for PUSCH transmission that overcome problems associated with conventional methods and apparatuses.

According to an aspect, there is provided a method for transmitting on a physical uplink shared channel, PUSCH, comprising: receiving, by a terminal device, configuration information including M transmission configuration indication, TCI, states; receiving, by the terminal device, an activation command to activate K of the M TCI states; receiving, by the terminal device, downlink control information, DCI, to schedule a PUSCH transmission, the DCI indicating a selected TCI state from among the K TCI states; determining, by the terminal device, a transmission beam using the selected TCI state; and transmitting, by the terminal device, on the PUSCH according to the determined transmission beam.

In some embodiments, the terminal device receives the configuration of M TCI states in a radio resource control, RRC, parameter.

In some embodiments, the terminal device receives the activation command through a medium access control element, MAC CE.

In some embodiments, the MAC CE maps the K TCI states to codepoints of an uplink transmission configuration indication field of the DCI.

In some embodiments, the terminal device receives the DCI through a physical downlink control channel, PDCCH, transmission.

In some embodiments, the selected TCI state comprises a reference signal resource configured as spatial relation information, and wherein the terminal device transmits on the PUSCH using a spatial domain transmit filter that is the same as a spatial domain filter used to transmit or receive the reference signal configured as the spatial relation information in the selected TCI state.

In some embodiments, the reference signal resource comprises a downlink reference signal resource or an uplink reference signal resource.

In some embodiments, the downlink reference signal resource comprises a channel state information reference signal, CSI-RS, resource or a synchronization signal/physical broadcast channel SS/PBCH block to provide spatial relation information for the transmission beam.

In some embodiments, the uplink reference signal resource comprises a SRS resource or a SRS resource index to provide spatial relation information for the transmission beam.

In some embodiments, the TCI state comprises an uplink power parameter, and wherein the terminal device transmits on the PUSCH using the uplink power indicated in the selected TCI state.

In some embodiments, the method further comprises: receiving, by the terminal device, a parameter configuring the terminal device to use codebook or non-codebook based PUSCH transmission; and determining by the terminal device whether to use codebook or non-codebook based PUSCH transmission based on the parameter.

In some embodiments, the method further comprises: determining, by the terminal device, whether the selected TCI state includes reference information for transmit precoding matrix index, TPMI; based on the selected TCI state including reference information for TPMI, the terminal device determining to use codebook based PUSCH transmission; based on the selected TCI state not including reference information for TPMI, the terminal device determining to use non-codebook based PUSCH transmission.

In some embodiments, the selected TCI state comprises a sounding reference signal, SRS, resource providing a reference for a transmit TPMI, wherein the terminal device transmits on the PUSCH according to a codebook based transmission by using a precoder indicated by the TPMI indicated in the selected TCI state.

In some embodiments, the terminal device transmits on the PUSCH according to a non-codebook based transmission by using a precoder based on an SRS resource configured for spatial relation information configured in the selected TCI state.

In some embodiments, the DCI comprises a dynamic PUSCH grant.

In some embodiments, the method further comprises, before receiving the DCI, receiving, by the terminal device, configuration information of a configured PUSCH grant, wherein the received DCI including the selected TCI activates the configured PUSCH grant.

In some embodiments, prior to the terminal device receiving the DCI to schedule the PUSCH transmission, the method comprises: receiving, by a terminal device, configuration information indicating whether an indication of a selected TCI state will be present in the DCI to schedule the PUSCH transmission; and based on the configuration information indicating that a selected TCI state will not be present in the DCI to grant the PUSCH transmission, the terminal device transmitting on the granted PUSCH in a fallback mode using a spatial domain transmission filter that is same as a spatial domain filter used to receive the DCI.

In some embodiments, the configuration information comprises a control resource set, CORESET, configuration.

In some embodiments, in the fallback mode, for power control the terminal device uses a periodic CSI-RS resource that is configured as Quasi Co-location Type-D, QCL-TypeD, for the CORESET where the received DCI is used to measure the path loss.

In some embodiments, the configuration information including the M TCI states is received as a joint state pool with TCI states used to decode a physical downlink shared channel, PDSCH transmission.

In some embodiments, the terminal device is configured with a set of UL bandwidth parts, BWPs; and wherein the configuration information includes a common set of TCI states for all the UL BWPs.

In some embodiments, the terminal device is configured with a set of component carriers, CCs; and wherein the configuration information includes a common set of TCI states for all the CCs.

According to an aspect, there is provided a method for transmitting on a physical uplink shared channel, PUSCH, comprising: receiving, by a terminal device, configuration information, determining, by the terminal device, from the configuration information whether an indication of an uplink transmission state will be present in a downlink control information, DCI, scheduling a PUSCH grant; receiving, by the terminal device, the DCI scheduling the PUSCH grant; based on the terminal device determining from the configuration information that the DCI will not include an indication of the uplink transmission state, transmitting on the PUSCH using a spatial domain transmission filter that is same as a spatial domain filter used to receive the DCI.

In some embodiments, the configuration information comprises a control resource set, CORESET, configuration.

In some embodiments, when transmitting on the PUSCH using a spatial domain transmission filter that is same as a spatial domain filter used to receive the DCI, the terminal device uses for power control a periodic CSI-RS resource that is configured as Quasi Co-location Type-D, QCL-TypeD, for the CORESET.

In some embodiments, the method further comprises: receiving, by the terminal device, information including M transmission configuration indication, TCI, states; receiving, by the terminal device, an activation command to activate K of the M TCI states; based on the terminal device determining from the configuration information that the DCI will include the indication of the uplink transmission state, receiving, by the terminal device, the DCI indicating a selected TCI state from among the K TCI states, and determining, by the terminal device, a transmission beam using the selected TCI state; and transmitting, by the terminal device, on the PUSCH according to the determined transmission beam.

According to an aspect, there is provided a computer-readable medium having computer-executable instructions to cause one or more processors of a computing device to carry out the method of any one of the embodiments.

According to an aspect, there is provided a terminal device for transmitting on a physical uplink shared channel, PUSCH, comprising: a communication unit to: receive configuration information including M transmission configuration indication, TCI, states; receive an activation command to activate K of the M TCI states, and receive downlink control information, DCI, to schedule a PUSCH transmission, the DCI indicating a selected TCI state from among the K TCI states; and a processing unit to: determine a transmission beam using the selected TCI state; and control the communication unit to transmit on the PUSCH according to the determined transmission beam.

In some embodiments, the communication unit is configured to receive the configuration of M TCI states in a radio resource control, RRC, parameter.

In some embodiments, the communication unit is configured to receive the activation command through a medium access control element, MAC CE.

In some embodiments, the MAC CE maps the K TCI states to codepoints of an uplink transmission configuration indication field of the DCI.

In some embodiments, the communication unit is configured to receive the DCI through a physical downlink control channel, PDCCH, transmission.

In some embodiments, the selected TCI state comprises a reference signal resource configured as spatial relation information, and wherein the processing unit is configured to control the communication unit to transmit on the PUSCH using a spatial domain transmit filter that is the same as a spatial domain filter used to transmit or receive the reference signal configured as the spatial relation information in the selected TCI state.

In some embodiments, the reference signal resource comprises a downlink reference signal resource or an uplink reference signal resource.

In some embodiments, the downlink reference signal resource comprises a channel state information reference signal, CSI-RS, resource or a synchronization signal/physical broadcast channel SS/PBCH block to provide spatial relation information for the transmission beam.

In some embodiments, the uplink reference signal resource comprises a SRS resource or a SRS resource index to provide spatial relation information for the transmission beam.

In some embodiments, the TCI state comprises an uplink power parameter, and wherein the processor is configured to control the communication unit to transmit on the PUSCH using the uplink power indicated in the selected TCI state.

In some embodiments, the communication unit is configured to receive a parameter configuring the terminal device to use codebook or non-codebook based PUSCH transmission; and wherein the processing unit is configured to determine whether to use codebook or non-codebook based PUSCH transmission based on the parameter.

In some embodiments, the processing unit is configured to: determine whether the selected TCI state includes reference information for transmit precoding matrix index, TPMI; based on the selected TCI state including reference information for TPMI, determine to use codebook based PUSCH transmission; based on the selected TCI state not including reference information for TPMI, determine to use non-codebook based PUSCH transmission.

In some embodiments, the selected TCI state comprises a sounding reference signal, SRS, resource providing a reference for a transmit TPMI, wherein the processing unit is configured to control the communication unit to transmit on the PUSCH according to a codebook based transmission by using a precoder indicated by the TPMI indicated in the selected TCI state.

In some embodiments, the processing unit is configured to control the communication unit to transmit on the PUSCH according to a non-codebook based transmission by using a precoder based on an SRS resource configured for spatial relation information configured in the selected TCI state.

In some embodiments, the DCI comprises a dynamic PUSCH grant.

In some embodiments, the communication unit is configured to, before receiving the DCI, receive configuration information of a configured PUSCH grant, wherein the received DCI including the selected TCI activates the configured PUSCH grant.

In some embodiments, prior to the terminal device receiving the DCI to schedule the PUSCH transmission: the communication unit is configured to receive configuration information indicating whether an indication of a selected TCI state will be present in the DCI to schedule the PUSCH transmission; and the processing unit is configured to, based on the configuration information indicating that a selected TCI state will not be present in the DCI to grant the PUSCH transmission, control the communication unit to transmit on the granted PUSCH in a fallback mode using a spatial domain transmission filter that is same as a spatial domain filter used to receive the DCI.

In some embodiments, the configuration information comprises a control resource set, CORESET, configuration.

In some embodiments, wherein in the fallback mode, for power control the terminal device is configured to use a periodic CSI-RS resource that is configured as Quasi Co-location Type-D, QCL-TypeD, for the CORESET where the received DCI is used to measure the path loss.

In some embodiments, the communication unit is configured to receive the configuration information including the M TCI states as a joint state pool with TCI states used to decode a physical downlink shared channel, PDSCH transmission.

In some embodiments, the terminal device is configured with a set of UL bandwidth parts, BWPs; and wherein the configuration information includes a common set of TCI states for all the UL BWPs.

In some embodiments, the terminal device is configured with a set of component carriers, CCs; and wherein the configuration information includes a common set of TCI states for all the CCs.

According to an aspect, there is provided a terminal device for transmitting on a physical uplink shared channel, PUSCH, comprising: a communication unit to: receive configuration information, and receive a downlink control information, DCI, scheduling a PUSCH grant; and a processing unit to: determine, from the configuration information, whether an indication of an uplink transmission state will be present in the DCI scheduling the PUSCH grant; and based on determining from the configuration information that the DCI will not include an indication of the uplink transmission state, control the communication unit to transmit on the PUSCH using a spatial domain transmission filter that is same as a spatial domain filter used to receive the DCI.

In some embodiments, the configuration information comprises a control resource set, CORESET, configuration.

In some embodiments, when transmitting on the PUSCH using a spatial domain transmission filter that is same as a spatial domain filter used to receive the DCI, the terminal device is configured to use for power control a periodic CSI-RS resource that is configured as Quasi Co-location Type-D, QCL-TypeD, for the CORESET.

In some embodiments, the communication unit is configured to: receive information including M transmission configuration indication, TCI, states, and receive an activation command to activate K of the M TCI states; and wherein the processing unit is configured to, based on determining from the configuration information that the DCI will include the indication of the uplink transmission state: determine a transmission beam using a TCI state selected by the DCI from among the K TCI states, and control the communication unit to transmit on the PUSCH according to the determined transmission beam.

According to an aspect, there is provided a method for initiating transmission by a terminal device on a physical uplink shared channel, PUSCH, the method comprising: transmitting, by a network device, configuration information including M transmission configuration indication, TCI, states; transmitting, by the network device, an activation command to activate K of the M TCI states; transmitting, by the network device, downlink control information, DCI, to schedule a PUSCH transmission, the DCI indicating a selected TCI state from among the K TCI states, the selected TCI state indicating a transmission beam to be used for the scheduled PUSCH transmission; and receiving, by the network device, the scheduled PUSCH transmission.

According to an aspect, there is provided a method for initiating transmission by a terminal device on a physical uplink shared channel, PUSCH, the method comprising: transmitting, by a network device, configuration information indicating whether an indication of an uplink transmission state will be present in a downlink control information, DCI, scheduling a PUSCH grant; transmitting, by the network device, the DCI scheduling the PUSCH grant; receiving, by the network device, the scheduled PUSCH.

According to an aspect, there is provided a computer-readable medium having computer-executable instructions to cause one or more processors of a computing device to carry out the method of any of the embodiments.

According to an aspect, there is provided a network device for initiating transmission by a terminal device on a physical uplink shared channel, PUSCH, the network device comprising: a communication unit; and a processing unit to: control the communication unit to transmit configuration information including M transmission configuration indication, TCI, states; control the communication unit to transmit an activation command to activate K of the M TCI states; and control the communication unit to transmit downlink control information, DCI, to schedule a PUSCH transmission, the DCI indicating a selected TCI state from among the K TCI states, the selected TCI state indicating a transmission beam to be used for the scheduled PUSCH transmission, wherein the communication unit is configured to receive the scheduled PUSCH transmission.

According to an aspect, there is provided a network device for initiating transmission by a terminal device on a physical uplink shared channel, PUSCH, the network device comprising: a communication unit; and a processing unit to: control the communication unit to transmit configuration information indicating whether an indication of an uplink transmission state will be present in a downlink control information, DCI, scheduling a PUSCH grant; and control the communication unit to transmit the DCI scheduling the PUSCH grant, wherein the communication unit is configured to receive the scheduled PUSCH transmission.

According to an aspect, there is provided a terminal device, comprising: a processor; and a memory configured to store a computer program capable of being run in the processor, wherein the processor is configured to run the computer program to perform the steps in the method of any of the terminal device method embodiments.

According to an aspect, there is provided a network device, comprising: a processor; and a memory configured to store a computer program capable of being run in the processor, wherein the processor is configured to run the computer program to perform the steps in the method of any of the network device method embodiments.

These and other aspects of the present application may become more readily apparent from the following description of the embodiments.

BRIEF DESCRIPTION OF THE DRAWINGS

Embodiments will now be described, by way of example only, with reference to the accompanying drawings, in which.

DETAILED DESCRIPTION

Figure 1:
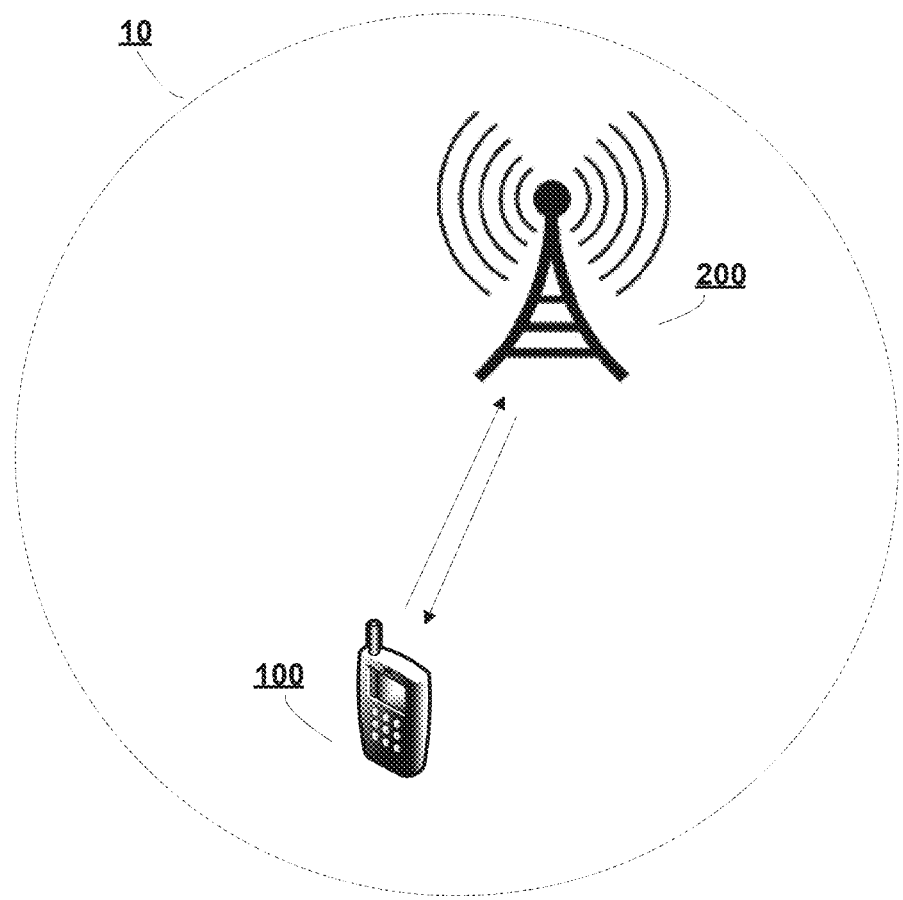
FIG. 1 shows a schematic illustration of a system including a network device and a terminal device.

Technical solutions in the embodiments of the present application will be described clearly and completely below with reference to the accompanying drawings.

These technical solutions may be applied to a 5G NR communication system. For example, they may be used for FR2. FR2 includes frequency bands from 24.25 GHz to 52.6 GHz. Generally, in FR2, to receive multi-TRP transmission, the UE would use multiple Rx antenna panels and use a different panel to receive PDCCH/PDSCH from different TRPs.

It is to be understood that these technical solutions may also be applied to various communication systems, for example, a Global System of Mobile communication (GSM), a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, and New Radio (NR) or future 5G systems, and the like.

The technical solutions may be applied to a variety of communication systems, for example, an orthogonal frequency division multiplexing (OFDM) system.

A terminal device in the embodiments may refer to a user equipment (UE), an access terminal, a subscriber unit, a subscriber station, a mobile station, a remote station, a remote terminal, a mobile device, a user terminal, a terminal, a wireless communication device, a user agent, or a user apparatus. The access terminal may be a cellular phone, a cordless phone, an SIP (Session Initiation Protocol) phone, a WLL (Wireless Local Loop) station, a PDA (Personal Digital Assistant), a handheld device having a wireless communication function, a computing device, or another processing device connected to a wireless modem, a vehicle-mounted device, a wearable device, a terminal device in a future 5G network, or a terminal device in a future evolutional PLMN (Public Land Mobile Network), and the like. However, the embodiments of the present application are not limited thereto.

A network device in the embodiments of the present application may be a device for communicating with the terminal device. Specifically, the network device may be a Base Transceiver Station (BTS) in a GSM system or a CDMA system, a NodeB (NB) in a WCDMA system, an Evolutional NodeB (eNB or eNodeB) in an LTE system, a wireless controller, or a relay station, an access point, a vehicle-mounted device, a wearable device, a network device in 5G network (for example, gNB), or a network device in a future evolutional Public Land Mobile Network (PLMN), etc. The network device may include a transmission-reception point (TRP) of a base station (for example, a gNB). However, the embodiments of the present application are not limited thereto.

A transmission point (TP) is a set of geographically co-located transmit antennas (e.g. antenna array (with one or more antenna elements)) for one cell or part of one cell. Transmission Points can include base station (ng-eNB or gNB) antennas, remote radio heads, a remote antenna of a base station, etc. One cell can include one or multiple transmission points. For a homogeneous deployment, each transmission point may correspond to one cell.

A reception point (RP) is a set of geographically co-located receive antennas (e.g. antenna array (with one or more antenna elements)) for one cell or part of one cell. Reception Points can include base station (ng-eNB or gNB) antennas, remote radio heads, a remote antenna of a base station, and so on. One cell can include one or multiple reception points. For a homogeneous deployment, each reception point may correspond to one cell.

A transmission-reception point (TRP) is a set of geographically co-located antennas (e.g. antenna array (with one or more antenna elements)) supporting TP and/or RP functionality.

A wireless communication network includes one or more fixed base infrastructure units forming a network distributed over a geographical region. As an example, the network device may serve a number of terminal devices within a serving area, for example, a cell, or within a cell sector. In some systems, one or more network devices are coupled to a controller (such as a wireless controller) forming an access network that is coupled to one or more core networks. Base stations (e.g. gNB) are examples of network devices in the wireless network, the serving area of which may or may not overlap with each other.

A communication system in general may include a terminal device and a network device. The network device is configured to provide communication services for the terminal device and access to a core network. The terminal device accesses the network by searching a synchronous signal, broadcast signal and the like transmitted by the network device, thereby communicating with the network.

FIG. 1 shows a schematic illustration of a communication system 10 according to an embodiment. The system 10 comprises terminal device 100 and a network device 200 that are in communication with each other. As shown in FIG. 1, the terminal device 100 and network device 200 can perform uplink transmission (terminal device 100 to network device 200) and downlink transmission (network device 200 to terminal device 100).

It will be appreciated that in practical implementations of embodiments, there may be many such terminal devices and/or network devices, but one of each will be described with relation to FIG. 1 for ease of explanation.

In this embodiment, the communication system 10 is the 5G NR communication system. However, embodiments of the invention are not limited to this and any suitable communication system could be used instead.

In this embodiment, the terminal device 100 is a UE. More specifically, in this embodiment, the terminal device 100 is a smartphone. However, embodiments of the invention are not limited to this and any suitable terminal device capable of communicating with a network device 200 could be used instead. Examples include a PDA, tablet, or other suitable computer devices.

In this embodiment, the network device 200 is a base station. More specifically, the network device 200 is a gNB (or 'gNodeB'). However, embodiments of the invention are not limited to this and any suitable network device capable of communicating with a terminal device 100 could be used instead.

Figure 2:
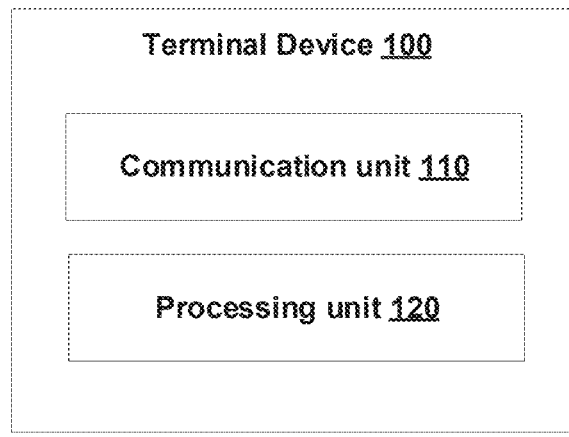
FIG. 2 shows a schematic illustration of the terminal device of the system.

FIG. 2 shows a schematic illustration of the terminal device 100 of the communication system 10 of FIG. 1. As shown in FIG. 1, the terminal device 100 comprises a communication unit 110 and a processing unit 120. In one example, the communication unit 110 may be a transceiver, and the processing unit 120 may be a processor.

The communication unit 110 is configured to communicate with the network device 200. More specifically, the communication unit 110 is configured to perform both uplink communication (i.e. terminal device 100 to network device 200) and downlink communication (i.e. network device 200 to terminal device 100)

The processing unit 120 is configured to control the overall functionality of the terminal device 100, including that of the communication 110. This includes controlling the communication unit 110 to perform both uplink and downlink communications, as well as processing signals received through the downlink transmissions.

Figure 3:
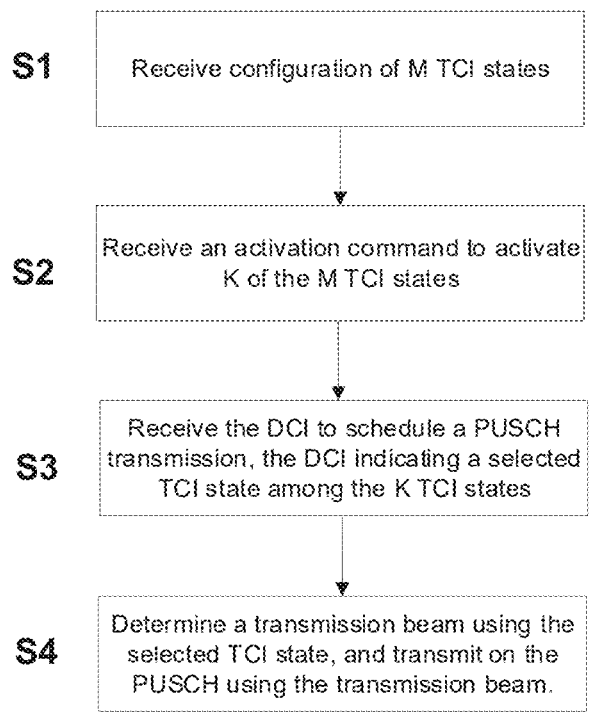
FIG. 3 shows a flowchart of the operation of the terminal device according to an embodiment.

FIG. 3 shows a flowchart of the operation of the terminal device 100 of FIG. 2. Through the flowchart of FIG. 3 discussed below, the terminal device 100 can be configured to perform PUSCH transmissions. In addition, through the flowchart of FIG. 3, the terminal device 100 can be configured in such a way as to allow efficient Tx beam switching, as discussed in detail below.

At step S1 of FIG. 3, the terminal device 100 receives a configuration of M (e.g. 64 or 128) TCI states. The TCI states will often be referred to in this application as uplink (UL) TCI states (as they can be used for PUSCH, which is an uplink transmission). In some embodiments, the configuration of M TCI states is received through an RRC parameter (e.g. the PUSCH-Config parameter). For example, each of the M UL TCI state configurations could have a UL TCI State ID.

Each TCI state may include information relating to a reference signal configured as spatial relation information. As discussed in more detail below, the reference signal may be a downlink or uplink reference signal.

At step S2, the terminal device 100 receives an activation command to activate K of the M UL TCI. For example, the activation command may activate K (e.g. a number between 1 and 8) of the M TCI states to codepoints of a UL TCI field of a DCI (e.g. a "UL Transmission Configuration Indication" field of the DCI). In some embodiments, the activation command is received through a layer higher than the physical layer, but lower than the layer used to receive the M UL TCI states. In some embodiments, the activation command is received on the MAC layer, e.g. through a MAC CE command. For example, the MAC CE may include the UL TCI State IDs of the K TCI states to be activated.

In other words, the activation command (e.g. MAC CE) is used to activate a relatively small number of the total number of configured TCI states, and those activated TCI states can be considered as 'active' TCI states and which the terminal device 100 should track (instead of having to track all M TCI states). In some embodiments, K may be greater than 4, which is larger than the maximum number of SRS resources in a SRS resource set.

Optionally, a step can take place between steps S2 and S3, in which the terminal device 100 transmits one or more SRS signal(s) as requested (or configured) by the network device 200. These SRS signals can be used by the network device 200 to select the optimum precoder and rank value for uplink transmission. However, this step can be omitted. The beam indication for SRS may provided by the parameter SpatialRelationInfo which contains one DL or UL reference signal providing Tx beam information.

Downlink control information (DCI) provides the terminal device 100 with information such as physical layer (Layer 1) resource allocation and power control commands for both uplink and downlink transmission. DCI is transmitted on the Physical Downlink Control Channel (PDCCH), e.g. with 24-bit cyclic redundancy check (CRC) attachment. There are multiple DCI formats defined to meet different needs.

At step S3, the terminal device 100 receives the DCI to schedule a PUSCH transmission (i.e. in DCI format that schedules PUSCH, e.g. DCI Format 0_0 or 0_1), the DCI indicating a selected TCI state among the K TCI states. For example, the DCI may comprise an uplink PUSCH grant dynamically scheduling a PUSCH transmission. In another example, the DCI may activate a previously configured grant for a PUSCH transmission (e.g. a configured grant Type 2), as will be discussed in more detail layer. In each of these examples, the DCI indicates one TCI state through a DCI field such as "UL Transmission Configuration Indication", though embodiments are not limited to this and any suitable DCI field could be used. Some specific examples of DCIs granting PUSCH transmissions will be discussed in detail later, for example with regard to FIGS. 7 and 12.

By enabling the scheduling DCI to select from one of the K (e.g. 8) states, flexibility is enhanced, while the DCI size does not need to be significantly increased. In other words, the DCI may only need to have a size suitable to indicate one of the K TCI sates, instead of needing to have a size suitable to indicate one of the M TCI states.

At step S4, the terminal device 100 determines a transmission beam (i.e., spatial domain transmission filter) using the selected TCI state, and then transmits on the granted PUSCH according to the determined transmission beam. The terminal device 100 may transmit the PUSCH with a spatial domain transmit filter that is the same as the spatial domain filter used to transmit or receive the reference signal configured as spatial relation information in the selected UL TCI state.

The terminal device 100 may transmit a signal on the granted PUSCH with the uplink transmit beam (i.e., spatial domain transmission filter), precoders (when using codebook based transmission) and uplink transmit power according the configuration carried in the indicated TCI state. In other words, the terminal device 100 may derive the transmission parameters for uplink transmission in the PUSCH grant according to the configuration parameters contained in the UL TCI state indicated in the DCI.

As discussed above, at step S1 the terminal device 100 can configured with a list of up to M UL TCI state configurations through a higher layer parameter for the transmission of PUSCH. Each UL TCI state contains parameters for configuring spatial relation information for transmitting uplink signal in PUSCH. The maximum value of M (e.g. 64 or 128) may be determined by UE capability. Likewise, the maximum value of K (e.g. 8) may also be determined by UE capability.

In some embodiments, each UL TCI state can contain one or more of the following configuration parameters:

- One downlink reference signal resource, e.g., CSI-RS resource or SS/PBCH block to provide spatial relation information configuration (i.e. uplink transmit beam information or spatial domain transmit filter).
- One or more uplink reference signal resource, e.g., SRS resource to provide spatial relation information configuration (i.e. uplink transmit beam information or spatial domain transmit filter).
- Multiple uplink reference signal resource indices, e.g., SRS resource index to provide spatial relation information configuration.
- One SRS resource to provide reference for uplink TMPI indication. For a PUSCH transmission, the TPMI is used to indicate the precoder to be applied over the layers {0 . . . v−1} and that corresponds to this SRS resource. This SRS resource can be same to the SRS resource configured for spatial relation information configuration. This SRS signal can provide the reference for antenna port indication for PUSCH transmission.
- Uplink power control parameters. For example, these can include a path loss reference signal that can be used by the terminal device 100 to calculate path loss, a value of $P_0$ (the target received power level) and a value of alpha (the power adjustment factor) and an index of closed loop power control.

As mentioned above, each UL TCI state may contain parameters for configuring spatial relation information for transmitting an uplink signal in PUSCH. For example, for codebook-based PUSCH, each UL TCI state may comprise uplink Tx beam information (e.g. a downlink reference signal resource index such as a CSI-RS resource or a SS/PBCH; an uplink reference signal resource index, such as an SRS resource; a CORESET Id or a PUCCH resource index).

In addition, each UL TCI state may comprise an SRS resource to provide a reference for a transmit precoding matrix index (TPMI) (i.e. uplink transmission precoder), and may also comprises uplink power control parameters (e.g. including path loss reference signals, value of $P_0$ and alpha and index of closed-loop power control). However, embodiments are not limited to these specific arrangements. For example, when non-codebook transmission is used, the UL TCI states may not comprise an SRS resource to provide a reference for a TPMI.

Hence, a TCI state for PUSCH may be associated with SRS resource(s) for port indication, spatial relation information, power control parameters, and path loss reference signals.

As mentioned above, for PUSCH transmission, different methods can be used for codebook-based transmission and non-codebook-based transmission.

In the method for codebook-based transmission, the network device 200 indicates one transmit beam and precoder(s) for one PUSCH transmission, and sends the DCI selecting an appropriate UL TCI state. The terminal device 100 then receives the DCI, and applies the indicated transmit beams and precoder(s) on the PUSCH transmission.

In other words, for codebook-based transmission, the terminal device 100 may determine the PUSCH transmission precoder based TPMI, and the transmission rank based on an SRS resource for TPMI reference configured in the indicated the selected UL TCI state and TPMI and transmission rank given by the DCI field of precoding information and number of layers. The TMPI is used to indicate the precoder to be applied over layers {0 . . . v−1} and that corresponds to the SRS resource that is configured as TMPI reference in the selected UL TCI state. The terminal device 100 may transmit the PUSCH with a spatial domain transmit filter that is the same as the spatial domain filter used to transmit or receive the reference signal configured as spatial relation information in the selected UL TCI state.

In the method for non-codebook-based transmission, the network device 200 indicates one or more transmit beams for PUSCH transmission, where each transmit beam corresponds to one transmission layer, and sends the DCI selecting an appropriate UL TCI state. The terminal device 100 then receives the DCI, and transmits one data stream with each indicated transmit beam and a number of transmission layers equal to the number of transmit beams.

In other words, for non-codebook-based transmission, the terminal device 100 may determine the PUSCH precoder and transmission rank based on the SRS resource(s) configured for spatial relation information configured in the selected UL TCI state. For the corresponding PUSCH transmission, the terminal device 100 may perform one-to-one mapping from the SRS resource(s) configured for spatial relation information in the selected UL TCI state to the indicated DM-RS(s) and their corresponding PUSCH layers {0 . . . v−1} in the DCI.

In an example, the DM-RS antenna ports (e.g. those discussed in subclause 6.4.1.1.3 of 3GPP TS 38.211 V15.5.0: "NR; Physical channels and modulation") are determined according to the ordering of DM-RS port(s) given by Tables 7.3.1.1.2-6 to 7.3.1.1.2-23 in sub clause 7.3.1.1.2 of 3GPP TS 38.212 V15.5.0: "NR; Multiplexing and channel coding".

To support these two methods of PUSCH transmission, embodiments provide different alternatives.

In one such alternative, the terminal device 100 is configured with a transmission mode as codebook-based or non-codebook-based through a higher layer parameter (for example, the RRC parameter TxConfig).

In such an alternative, if the terminal device 100 is configured with codebook-based transmission, the configured UL TCI state may contain a configuration for an uplink transmit beam and a configuration of an SRS signal providing a TPMI reference. If the terminal device 100 is configured with non-codebook-based transmission, the configured UL TCI states may contain one or more SRS resource signals to provide uplink transmit beam information.

In another alternative, the terminal device 100 is configured with a transmission mode as codebook-based or non-codebook-based without a higher layer parameter to specify this. In such embodiments, the configuration information in one UL TCI state may implicitly indicate codebook-based transmission or non-codebook-based transmission, without the need for this to be indicated by higher layer (e.g. RRC) signalling.

For example, if a UL TCI state provides a configuration of an SRS resource for a TPMI reference (i.e. port indication), then the PUSCH transmission according to the UL TCI state may be determined by the UE to be codebook-based transmission. However, if the UL TCI state does not provide a configuration of an SRS resource for TPMI reference (i.e. port indication), then the PUSCH transmission according to the second UL TCI state may be determined by the UE to be non-codebook transmission.

In other words, one UL TCI state can be configured with one or more than one SRS resource(s) for spatial relation information configuration. The terminal device 100 receives (at step S3) one DCI scheduling an uplink PUSCH grant, with the DCI indicating a selected UL TCI state.

If, in the selected UL TCI state, there is an SRS resource configuration for TPMI reference (i.e., port indication), the terminal device 100 can transmit on the PUSCH according to the selected UL TCI state using a codebook based mode. The terminal device 100 may then determine the PUSCH transmission precoder based TPMI, and the transmission rank based on the SRS resource for TPMI reference configured in the indicated the selected UL TCI state and TPMI and transmission rank given by the DCI field of precoding information and number of layers. The TMPI is used to indicate the precoder to be applied over layers $\{0 \ldots v-1\}$ and that corresponds to the SRS resource that is configured as TMPI reference in the selected UL TCI state. The terminal device 100 may transmit the PUSCH with a spatial domain transmit filter that is the same as the spatial domain filter used to transmit or receive the reference signal configured as spatial relation information in the selected UL TCI state.

If, in the selected UL TCI state, there is no configuration for TPMI reference, the terminal device 100 can determine to transmit on the PUSCH using a non-codebook-based mode. The terminal device 100 determines the PUSCH precoder and transmission rank based on the SRS resource(s) configured for spatial relation information configured in the selected UL TCI state. For the corresponding PUSCH transmission, the terminal device 100 may perform one-to-one mapping from the SRS resource(s) configured for spatial relation information in the selected UL TCI state to the indicated DM-RS(s) and their corresponding PUSCH layers $\{0 \ldots v-1\}$.

Hence, in this alternative, there is no need for a higher layer parameter (e.g. the RRC parameter TxConfig) to be used to configure the terminal device 100 with either codebook or non-codebook based transmission. As such, the overhead associated with scheduling PUSCH transmissions can be reduced.

It will be appreciated that, in current design of NR release 15, for PDSCH decoding, the UE can be configured with a list of downlink TCI State configurations within the higher layer parameter PDSCHConfig to decode PDSCH according to a detected PDCCH with DCI intended for the UE and the given serving cell. Each DL TCI State contains parameters for configuring a quasi co-location relationship between one or two downlink reference signals and the DM-RS ports of the PDSCH.

In some embodiments, the M UL TCI states and the DL TCI can be configured using separate higher level (e.g. RRC) parameters for PUSCH and PDSCH (e.g. PUSCHConfig and PDSCHConfig).

In some embodiments, the M UL TCI states and the DL TCI can be configured using a same higher level (e.g. RRC) parameter. In other words, a joint TCI state pool could be configured for the UE for downlink and uplink.

Figure 4:
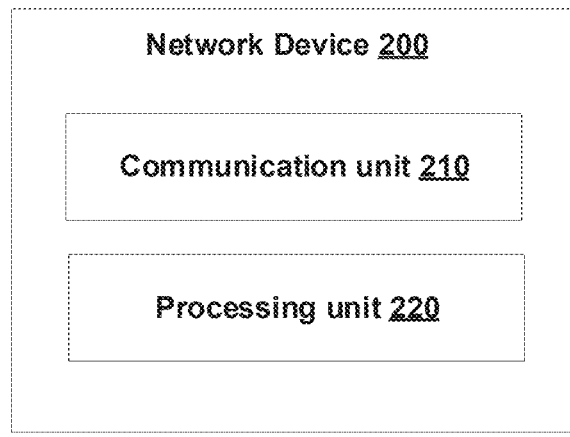
FIG. 4 shows a schematic illustration of the network device of the system.
Figure 5:
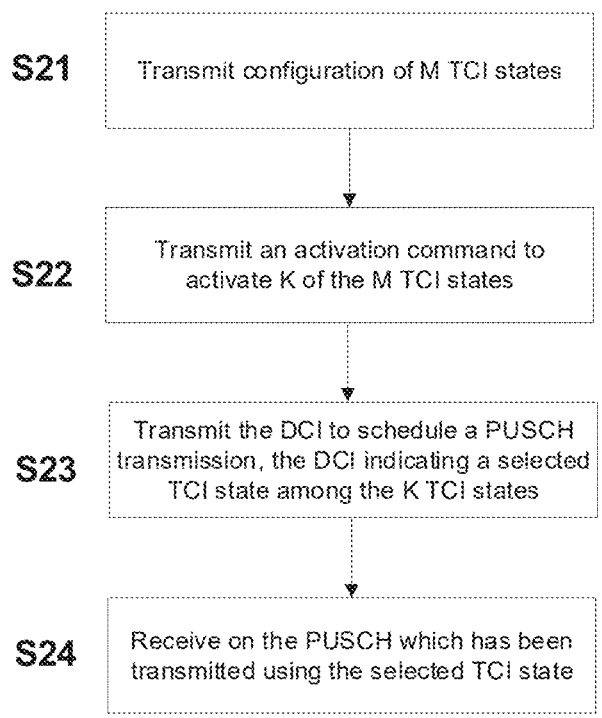
FIG. 5 shows a flowchart of the operation of the network device according to an embodiment.

FIG. 4 shows a schematic illustration of the network device 200 of the communication system 10 of FIG. 1, while FIG. 5 shows a flowchart of the operation of the network device 200 of FIG. 4. The flowchart of FIG. 5 showing the operations of the network device 200 generally corresponds to the flowchart of FIG. 3, but from the perspective of the network device 200, and corresponding considerations apply.

As shown in FIG. 4, the network device 200 comprises a communication unit 210 and a processing unit 220. In one example, the communication unit 210 may be a transceiver, and the processing unit 220 may be a processor.

The communication unit 210 is configured to communicate with the terminal device 100. More specifically, the communication unit 210 is configured to perform both uplink communication (i.e. terminal device 100 to network device 200) and downlink communication (i.e. network device 200 to terminal device 100)

The processing unit 220 is configured to control the overall functionality of the network device 200, including that of the communication 210. This includes controlling the communication unit 210 to perform both uplink and downlink communications, as well as processing signals received through the uplink transmissions.

FIG. 5 shows a flowchart of the operation of the network device 200 of FIG. 4. The flowchart of FIG. 5 showing the operations of the network device 200 generally corresponds to the flowchart of FIG. 3, but from the perspective of the network device 200, and corresponding considerations apply.

Through the flowchart of FIG. 5 discussed below, the network device 200 can configure the terminal device 100 to perform PUSCH transmissions. In addition, through the flowchart of FIG. 5, the network device 200 can configured the terminal device 100 in such a way as to allow efficient Tx beam switching, as discussed in detail below.

At step S21 of FIG. 5, the network device 200 transmits a configuration of M TCI states to the terminal device 100.

At step S22, the network device 200 transmits an activation command to activate K of the M UL TCI states. For example, the activation command may activate K (e.g. a number between 1 and 8) of the M TCI states to codepoints of a UL TCI field of a DCI (e.g. a "UL Transmission Configuration Indication" field of the DCI).

At step S23, the network device 200 transmits the DCI to the terminal device 100, to grant a PUSCH transmission, the DCI indicating a selected TCI state among the K TCI states.

At step S24, the network device 200 receives the PUSCH from the terminal device 100, which has been transmitted using the selected TCI state.

Figure 6:
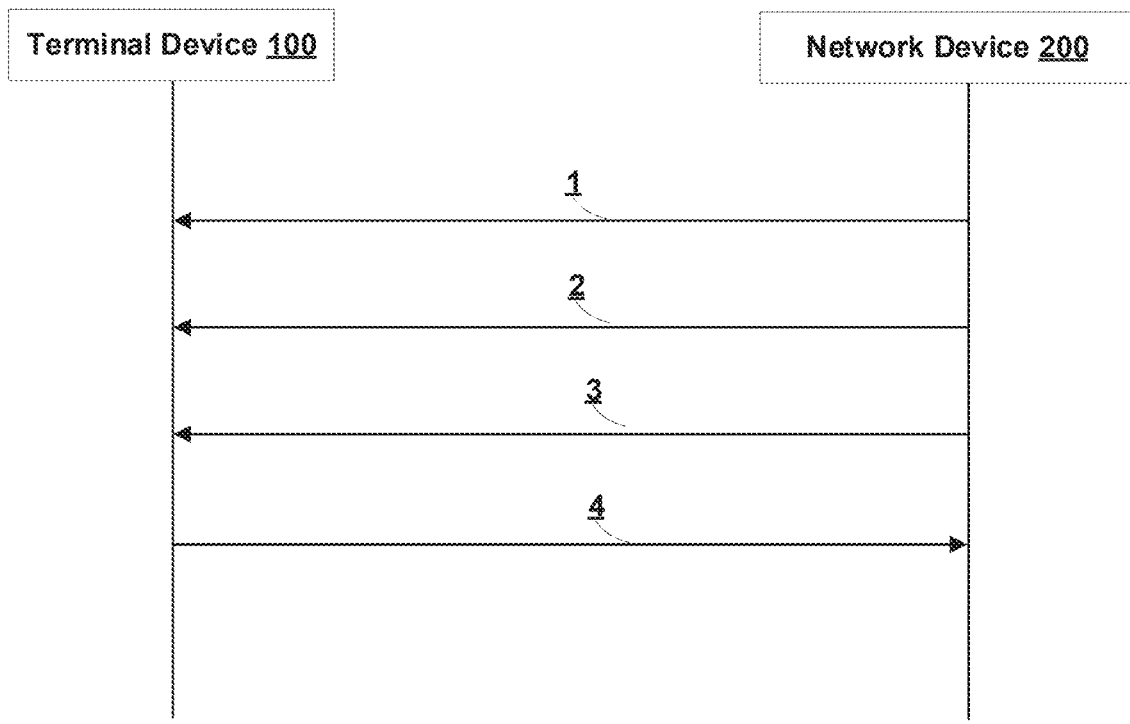
FIG. 6 shows a message flow procedure between the terminal device and network device of FIGS. 3 and 5.

The above detailed discussion in relation to the flowchart of FIG. 3 applies correspondingly to this flowchart of FIG. 5, and a repeated discussion will therefore be omitted. FIG. 6 shows a summary of the message flow procedure between the terminal device 100 and network device 200, according to the above discussion. FIG. 6 shows the following steps:

1. The network device 200 transmits a configuration of M TCI states to the terminal device 100;
2. The network device 200 transmits an activation command to activate K of the M TCI states (e.g. to codepoints of a UL TCI field of a DCI to the terminal device 100);
3. The network device 200 transmits the DCI to the terminal device 100 to grant a PUSCH transmission, the DCI indicating a selected TCI state among the K TCI states;
4. The terminal device 100 transmits the PUSCH to the network device 200 using the selected TCI state.

It can be seen that this allows for a first higher layer signalling (e.g. RRC signalling) to configure a set of M (e.g. 64 or 128) TCI states, and second higher layer signalling (e.g. MAC signalling) to activate a sub-set K (e.g. a number between 1 and 8) of the TCI states. The second higher layer may be a higher layer than the first higher layer. Physical layer signalling (e.g. DCI) can then be used to select a specific TCI to be used to determine a transmission beam for PUSCH.

As such, when the UL TCI state used for PUSCH transmission needs changing (e.g. because a different spatial domain filter is needed due to the terminal device 100 moving), DCI transmission can be used to change to any of the other K (e.g. 8) mapped UL TCI states. In other words, steps S3-S4 can be repeated using a DCI indicating a different one of the K UL TCI states, without either of the higher layer signalling steps S1 or S2 needing to be repeated. Since this DCI transmission takes place on the physical layer, no additional higher layer (e.g. MAC or RRC) signalling is needed to change between the K UL TCI states.

Furthermore, in a scenario in which none of the K (e.g. 8) UL TCI states are the desired UL TCI state, a MAC CE command can be used to change the mapping. In other words, steps S2, S3, and S4 can be repeated to change which UL TCI states are mapped to the codepoints of the DCI, and therefore which UL TCI state can be indicated in a new DCI. Only if none of the M (e.g. 64 or 128) UL TCI states are the desired UL TCI state would it be necessary to repeat the RRC signalling in step S1.

It will be appreciated that in the current design of 5G NR release 15, for PUSCH transmission, the Tx beam for a PUSCH is not configured to PUSCH directly but uses an SRS resource as bridge.

A consequence of this is that, for codebook-based transmission, the gNB would have to use higher layer signalling (for example RRC) to re-configure the SRS resource set (i.e. containing one or two SRS resources, e.g. SRS resources #a, #b) to switch Tx beam for PUSCH. Similarly, for non-codebook-based PUSCH, the gNB would have to use higher layer signalling (for example RRC) to re-configure the SRS resource set (i.e. containing up to four SRS resources, e.g. SRS resources #a, #b, #c, #d) to switch Tx beam for PUSCH. This can cause large latency caused by beam switch operation. As explained above, PUSCH beam switching requires higher layer reconfiguration. Besides the signalling overhead, this also causes large latency for multi-beam operation.

It will be appreciated that increasing the number of SRS resources in the SRS resource set configured for PUSCH can improve the flexibility of PUSCH Tx beam indication. However, increasing the number of SRS resources in the set configured for codebook-based PUSCH (maximum two) or non-codebook-based PUSCH (maximum four) does not work. The SRS resources configured in the set for PUSCH are used for uplink CSI measurement. Generally, those SRS resources have multiple antenna ports, implement frequency hopping and occupy multiple symbols. On the other hand, all the SRS resource in one set may be allocated in the same slot and only up to six symbols within one slot can be allocated to SRS transmission. Thus, there is no room for us to increase the number of SRS resources in the set configured for codebook-based or non-codebook based transmission.

The use of M UL TCI states for PUSCH transmission rather than using SRS resources as a bridge for the PUSCH transmission allows for a reduction in the higher layer signalling overhead, as well as reducing the latency which can be associated with the use of configuring and using SRS resources for PUSCH transmission. This is because a relatively large number of UL TCI states (i.e. M, e.g. 64 or 128) may be configured by a higher layer parameter (e.g. RRC). Then a pool of states (i.e. K, e.g. up to 8) can be activated (e.g. on a layer higher than the physical layer, but lower than the layer used to receive the M UL TCI states), for example on the MAC layer via a MAC CE. The scheduling DCI can then select a desired TCI state for PUSCH. Hence, in this example, to activate a different set of K states, a MAC CE can be sent, thus reconfiguring the UE to potentially use a different set of K states (e.g. up to 8) without the need for RRC.

In some embodiments, K may be greater than 4, which is larger than the maximum number of SRS resources in a SRS resource set.

Furthermore, for a given set of K (e.g. up to 8) activated TCI states, the scheduling DCI can indicate a TCI from any of the K states. As indicated above, by enabling the scheduling DCI to select from one of the K (e.g. 8) states, flexibility is enhanced, while the DCI size does not need to be significantly increased.

Hence, unlike for using SRS resources as bridge for PUSCH, using TCI states in this way gives both greater flexibility and reduced latency.

Figure 7:
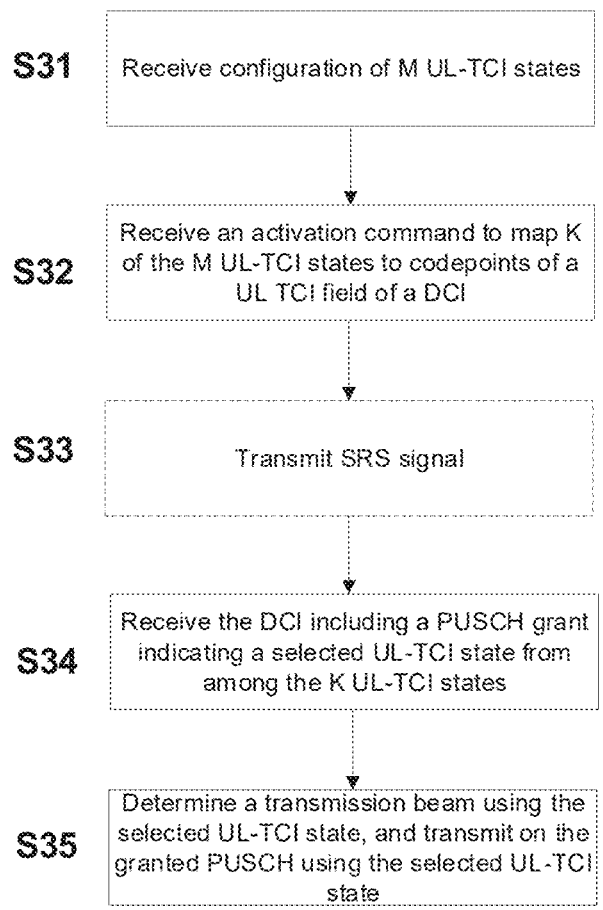
FIG. 7 shows a flowchart of the operation of the terminal device according to an embodiment.

FIG. 7 shows a flowchart of the operation of the terminal device 100 of FIG. 2 according to an embodiment. In the flowchart of FIG. 7, the DCI scheduling the PUSCH transmission is a DCI scheduling a PUSCH grant. In other words, through the flowchart of FIG. 7, dynamically scheduling of PUSCH transmissions is used.

Steps S31-S32 of FIG. 7 correspond to steps S1-S2 of FIG. 3 and repeated discussions thereof will be omitted.

At step S33 (which is optional, but shown here as an example), the terminal device 100 transmits one or more SRS signal(s) as requested (or configured) by the network device 200. These SRS signals can be used by the network device 200 to select the optimum precoder and rank value for uplink transmission. However, as discussed with reference to FIG. 2, this step can be omitted.

At step S34, the terminal device 100 receives a DCI including a PUSCH grant indicating a selected UL TCI state from among the K UL TCI states. Hence, in this embodiment the "DCI to activate a PUSCH transmission" discussed with reference to step S3 of FIG. 3 is specifically a DCI including a PUSCH grant indicating a selected UL TCI state from among the K UL TCI states. For example, the selected UL TCI state could be indicated through a DCI field named "UL Transmission Configuration Indication" in the scheduling DCI.

At step S35, the terminal device 100 determines a transmission beam using the selected TCI state, and then transmits on the granted PUSCH according to the determined transmission beam. Step S35 corresponds to step S4 of FIG. 3 and the above discussion of step S4 of FIG. 3 applies.

Figure 8:
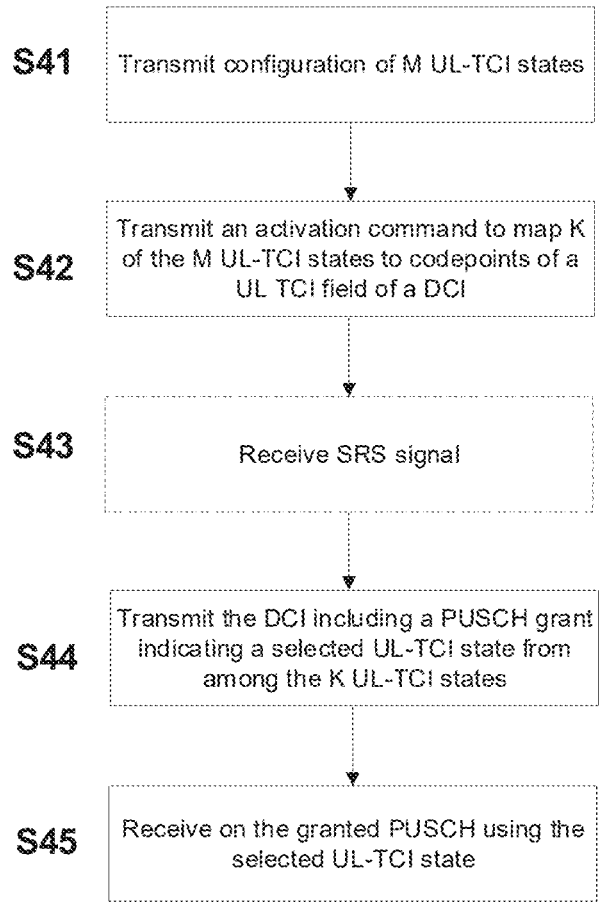
FIG. 8 shows a flowchart of the operation of the network device according to an embodiment.

FIG. 8 shows a flowchart of the operation of the network device 200 of FIG. 4. The flowchart of FIG. 8 showing the operations of the network device 200 generally corresponds to the flowchart of FIG. 7, but from the perspective of the network device 200, and corresponding considerations apply.

Steps S41-S42 of FIG. 8 correspond to steps S21-S22 of FIG. 5 and repeated discussions thereof will be omitted.

At step S43 (which is optional), the network device 200 receives one or more SRS signal(s) from the terminal device 100, as the network device 200 has previously requested from (or configured in) the terminal device 100.

At step S44, the network device 200 transmits a DCI including a PUSCH grant indicating a selected UL TCI state from among the K UL TCI states.

At step S45, the terminal device 100 then transmits the granted PUSCH using the selected UL TCI state. Step S45 corresponds to step S24 of FIG. 5 and the above discussion of step S25 of FIG. 5 (and corresponding step S4 of FIG. 3) applies.

More generally, the above discussion in relation to the flowchart of FIG. 7 applies correspondingly to this flowchart of FIG. 8, and a repeated discussion will therefore be omitted.

Figure 9:
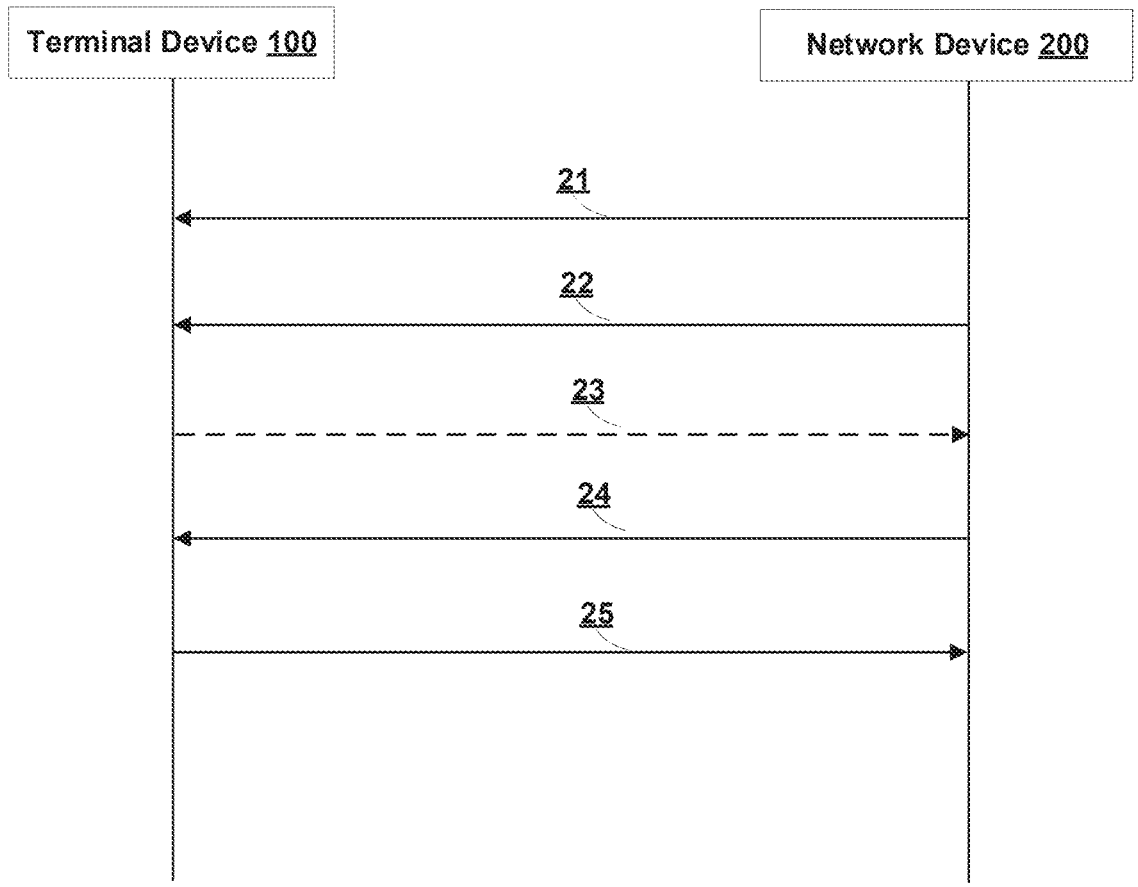
FIG. 9 shows a message flow procedure between the terminal device and network device of FIGS. 7 and 8.

FIG. 9 shows a summary of the message flow procedure between the terminal device 100 and network device 200, according to the above discussion. FIG. 9 shows the following steps:

21. The network device 200 transmits a configuration of M UL TCI states to the terminal device 100;
22. The network device 200 transmits an activation command to map K of the M UL TCI states to codepoints of a UL TCI field of a DCI;
23. The terminal device 100 optionally transmits one or more SRS signals to the network device 200;
24. The network device 200 transmits a DCI including a PUSCH grant indicating a selected UL TCI state from among the K UL TCI states;
25. The terminal device transmits the granted PUSCH using the selected UL TCI state.

It can be seen that this allows for flexibility in the dynamic scheduling of PUSCH transmissions. By configuring M (e.g. 64 or 128) UL TCI states using RRC, and mapping K (e.g. 4 or 8) of those states to the codepoints of a DCI, the flexibility for the network device 200 in selecting (and switching) transmit beams is increased. When the UL TCI state used for PUSCH transmission needs changing (e.g. because a different spatial domain filter is needed due to the terminal device 100 moving), DCI transmission can be used to change to any of the other K (e.g. 8) mapped UL TCI states, thereby avoiding the overheard and latency associated with higher layer signalling.

Embodiments of the invention also provide a fallback mode when using a UL TCI state framework, as discussing above. In some embodiments, a higher layer parameter, for example, using RRC, a parameter ul-tci-PresentInDCI can be configured to a CORESET to indicate whether the DCI field "UL Transmission Configuration Indication" would be present in a DCI scheduling PUSCH transmission (for example DCI format 0_1).

If a terminal device 100 is configured with the higher layer parameter ul-tci-PresentInDCI that is set as 'enabled' for the CORESET scheduling the PUSCH, the terminal device 100 may assume that the "UL Transmission Configuration Indication" field will be present in the DCI format scheduling PUSCH transmission of the PDCCH transmitted on the CORESET.

If a terminal device 100 is configured with the higher layer parameter ul-tci-PresentInDCI that is set as 'disabled' for the CORESET scheduling the PUSCH or a terminal device 100 is not configured with the higher layer parameter ul-tci-PresentInDCI for the CORESET scheduling the PUSCH, the terminal device 100 may perform the following:

The terminal device 100 may assume the "UL Transmission Configuration Indication" field is not present in the DCI format scheduling PUSCH transmission of the PDCCH transmitted on the CORESET.

The terminal device 100 may assume to transmit the PUSCH granted by the DCI with a spatial domain transmission filter that is the same as the spatial domain filter used to receive the PDCCH where the scheduling DCI is detected. In other words, the terminal device 100 may transmit that PUSCH using the Tx beam that is same to the Rx beam used to receive the PDCCH where the scheduling DCI is received.

For the power control on the PUSCH transmission, the terminal device 100 may use the periodic CSI-RS resource that is configured as QCL-TypeD for the CORESET where the scheduling DCI is received to measure the path loss.

For the power control on the PUSCH transmission, the terminal device 100 can assume $P_0$, alpha and index of closed loop power control can be a specific configured value, for example received via RRC.

The terminal device 100 can assume the PUSCH transmission is a single-RANK transmission.

To determine the SRS resource to provide reference for TMPI, the terminal device 100 can assume to use one particular SRS resource in the SRS resource set configured for codebook transmission.

Figure 10:
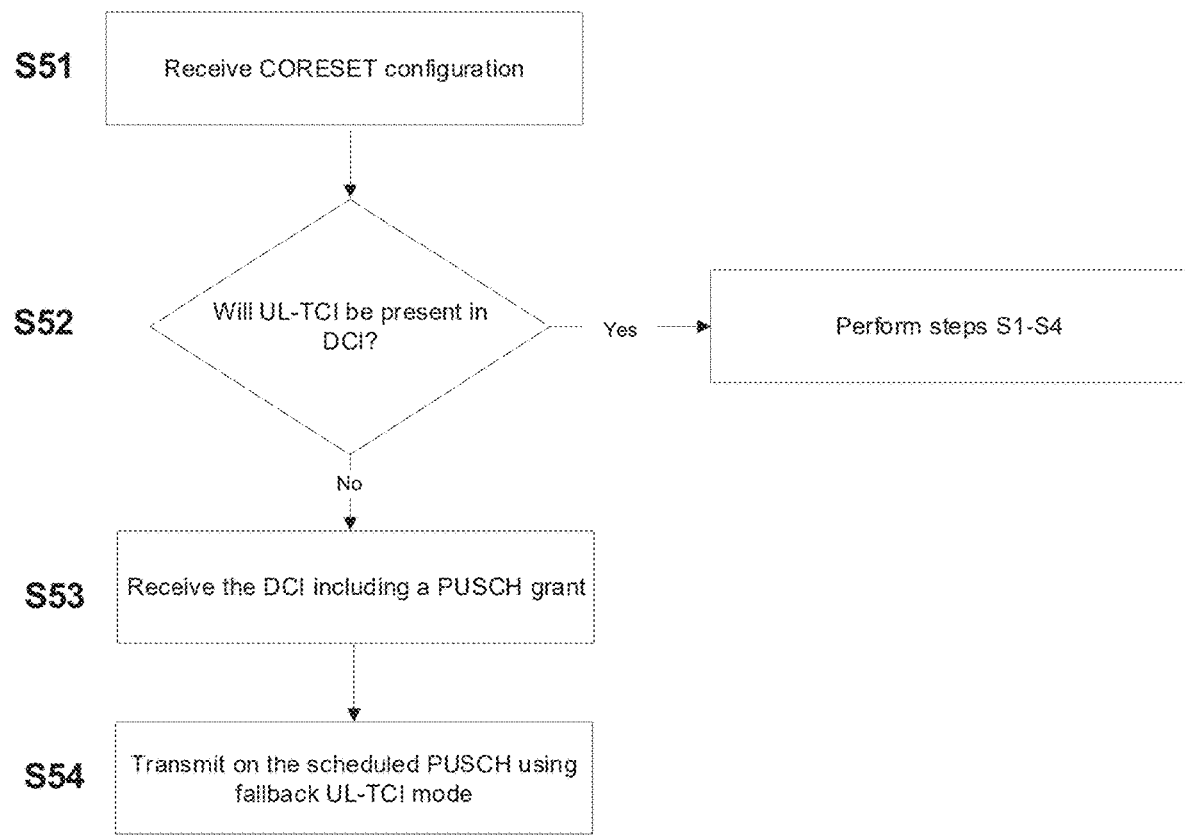
FIG. 10 shows a flowchart of the operation of the terminal device according to an embodiment.

FIG. 10 shows a flowchart of the operation of the terminal device 100 using such a fallback method.

The flowchart of FIG. 10 starts a step SM, in which the terminal device 100 receives a CORESET configuration. This configuration can (but is not required to, as discussed below) include a higher layer parameter indicating whether a field for configuring the UL TCI state (e.g. a "UL Transmission Configuration Indication" field) will be present in the DCI scheduling the PUSCH transmission (e.g. a DCI format 0_1). In this embodiment, the higher layer parameter will be referred to as an ul-tci-PresentInDCI parameter, the higher layer is the RRC layer, and the field for configuring the UL TCI state will be referred to as a "UL Transmission Configuration Indication" field, but embodiments are not limited thereto.

At step S52, the terminal device 100 processes the received CORESET configuration to determine whether the UL Transmission Configuration Indication field will be present in the DCI. In this embodiment, the terminal device 100 determines that the UL Transmission Configuration Indication field will be present if the ul-tci-PresentInDCI is set as 'enabled'. However, if the ul-tci-PresentInDCI is set as 'disabled', or is not configured in the CORESET configuration, the terminal device 100 determines that the UL Transmission Configuration Indication field will not be present in the DCI.

While these specific features have been discussed with reference to steps S51-S52, it will be appreciated that embodiments are not limited to this. More generally, the terminal device 100 can be configured with any higher layer parameter indicating whether or not a DCI scheduling a PUSCH will include an uplink transmission configuration indication field.

If the terminal device 100 determines that the UL Transmission Configuration Indication field will be present (i.e. that the answer at step S52 is 'yes'), the terminal device 100 proceeds to perform steps S1-S4 of FIG. 3. However, it will be appreciated that this specific order of steps is not essential and that any of steps S1 or S2 could take place before either of steps SM or S52. Steps S51 and S52 of FIG. 10 take place before steps S3-S4 of FIG. 3, since the terminal device 100 uses the information from steps S51-S52 when processing the DCI received at step S3.

If the terminal device 100 determines that the UL Transmission Configuration Indication field will not be present (i.e. that the answer at step S52 is 'no'), the terminal device 100 proceeds to perform step S53.

At step S53, the terminal device 100 receives the DCI including a PUSCH grant from the network device 200. As discussed above, this DCI does not include a UL Transmission Configuration Indication field.

In this case, at step S54, the terminal device 100 transmits the granted PUSCH using a fallback UL TCI mode. In this fallback UL TCI mode, the terminal device 100 transmits the granted PUSCH granted with a spatial domain transmission filter that is same as the spatial domain filter used to receive the PDCCH where the scheduling DCI is detected.

In other words, the terminal device 100 transmits the PUSCH using the Tx beam that is same as the Rx beam used to receive the PDCCH where the scheduling DCI is received. For the power control on the PUSCH transmission, the terminal device 100 uses the periodic CSI-RS resource that is configured as Quasi Co-location Type-D (QCL-TypeD) for the CORESET where the scheduling DCI is received to measure the path loss. For this power control the terminal device 100 assumes that $P_0$, alpha and the index of closed loop power control are a specific configured value, for example configured by RRC. Furthermore, the terminal device 100 assumes that the PUSCH transmission is single-RANK transmission. To determine the SRS resource to provide the reference for TPMI, the terminal device 100 uses one particular SRS resource. In this embodiment, the terminal device 100 uses the SRS resource configured as TPMI reference in an SRS resource in the SRS resource set configured for codebook transmission.

Figure 11:
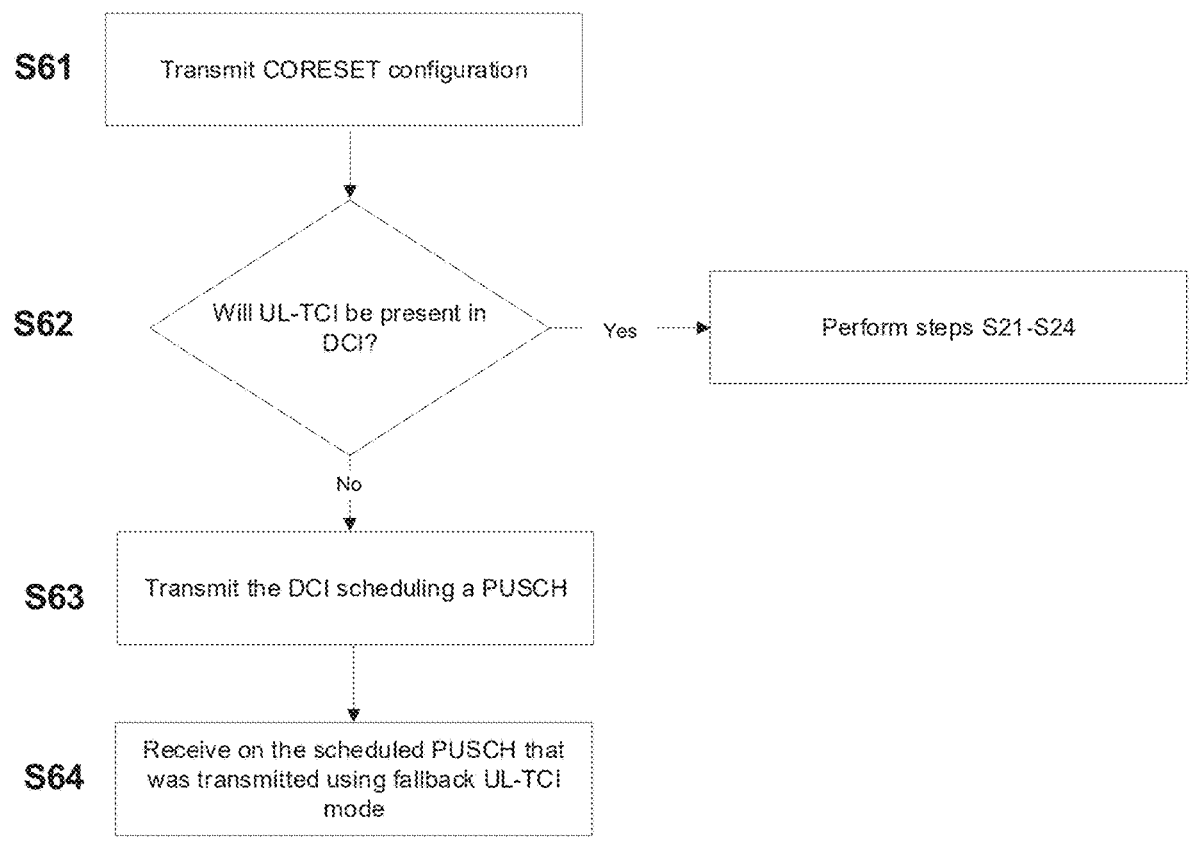
FIG. 11 shows a flowchart of the operation of the network device according to an embodiment.

FIG. 11 shows a flowchart of the method performed by the network device 200 in coordination with the method performed by the terminal device 100 in FIG. 10. The flowchart of FIG. 11 showing the operations of the network device 200 generally corresponds to the flowchart of FIG. 10, but from the perspective of the network device 200, and corresponding considerations apply.

At step S61, the network device 200 transmits a CORESET configuration.

At step S62, if the UL Transmission Configuration Indication will be present in the DCI, the network device 200 proceeds to perform the steps S21-S24 of FIG. 5. If the UL Transmission Configuration Indication field will not be present the network device 200 proceeds to perform step S63.

At step S63, the network device 200 transmits the DCI including a PUSCH grant to the terminal device 100.

In this case, at step S64, the network device 200 receives the granted PUSCH that was transmitted using fallback UL TCI mode.

The above detailed discussion in relation to the flowchart of FIG. 10 applies correspondingly to this flowchart of FIG. 11, and a repeated discussion will therefore be omitted.

As is apparent from the above discussion, this variant of FIGS. 10 and 11 provides a fallback mode for when a UL Transmission Indication field is not provided in a DCI. As such, the network device 200 is not required to always include a UL Transmission Indication field in a DCI granting a PUSCH, and the terminal device 100 can instead rely on a fallback mode in order to transmit the granted PUSCH. In other words, this variant increases the flexibility of the method used to configure, grant, and transmit PUSCH transmissions.

As discussed, PUSCH can be dynamically scheduled using uplink grant in uplink (e.g. DCI format DCI_0_0 or DCI_0_1).

It will be appreciated that two types of configured grant configuration schemes supported in 3GPP Release 15 that allow for data transmission without resource request. These are referred to as Type 1 and Type 2.

For Type 1 configured grant, the uplink grant configuration, and activation/deactivation is provided by RRC signalling. Hence, RRC signalling can activate a Type 1 configured grant (including the required configuration information), and then later deactivate the Type 1 configured grant.

For Type 2 configured grant, the uplink grant configuration is provided by RRC signalling, and the activation/deactivation is provided by DCIs via PDCCH.

While the above embodiments have discussed the use of UL TCI states for dynamically scheduling PUSCH transmissions, embodiments of the invention are not limited to this. In other embodiments, UL TCI states can be used for configured PUSCH grants.

Specifically, when PUSCH resource allocation is semi-statically configured by a higher layer parameter (e.g. RRC) such as configuredGrantConfig in the BWP-UplinkDedicated information element, and the PUSCH transmission corresponds to a configured grant, the following higher layer parameters can be applied in the transmission.

For Type 1 PUSCH transmission with a configured grant, a UL TCI state can be configured in RRC to provide the transmission parameter for uplink transmission in the uplink grant configured by the Type 1 PUSCH transmission. Hence, for Type 1, the activating RRC signalling can indicate a particular UL TCI state to be used. The PUSCH transmission can then be configured using the UL TCI state as discussed above.

For Type 2 PUSCH transmission with a configured grant, the transmission parameters for uplink transmission in the uplink grant configured by the Type 2 PUSCH transmission can follow the UL TCI state indicated in the triggering DCI.

Figure 12:
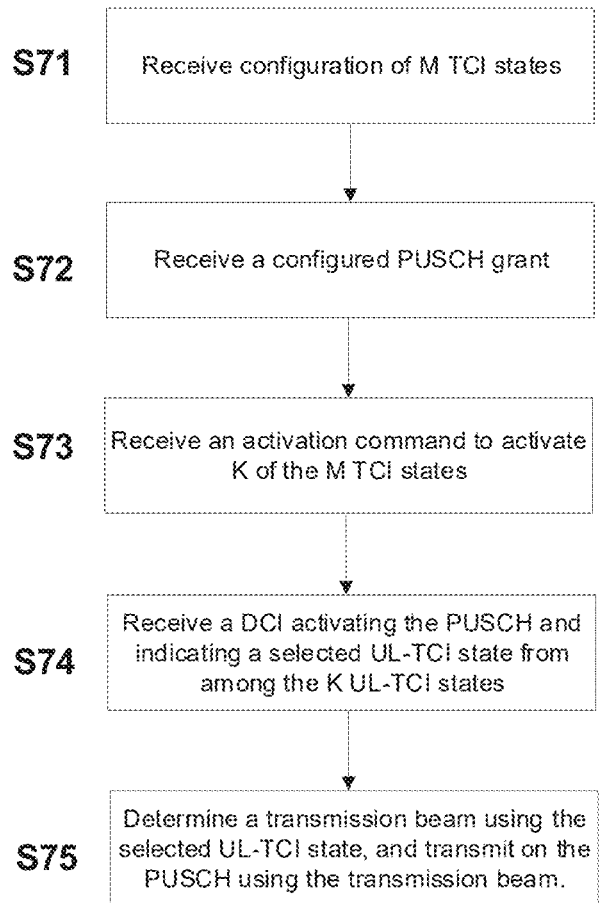
FIG. 12 shows a flowchart of the operation of the terminal device according to an embodiment.

FIG. 12 shows a flowchart of the operation of a terminal device 100 according to an embodiment. In the flowchart of FIG. 12, the DCI activating the PUSCH transmission is a DCI activating a configured grant. In other words, through the flowchart of FIG. 12, a configured grant Type 2 is used.

Steps S71 and S73 of FIG. 12 are respectively similar to steps S1 and S2 of FIG. 3, and repeated descriptions thereof will be omitted.

At step S72, the terminal device 100 receives a configured grant Type 2. In this embodiment, the configured grant Type 2 is semi-statically configured by the RRC parameter configuredGrantConfig in the BWP-UplinkDedicated information element. However, embodiments of the invention are not limited to this. For example, in alternative embodiments, the configured grant Type 2 can be configured by a different higher layer (i.e. higher than the physical layer) parameter.

At step S74, the terminal device 100 receives a DCI activating the configured grant Type 2 PUSCH and indicating a selected UL TCI state from among the K UL TCI states from the network device 200 activated in step S73. For example, the selected UL TCI state could be indicated through a DCI field named "UL Transmission Configuration Indication" in the activating DCI.

At step S75, the terminal device 100 then transmits on the granted PUSCH using the selected UL TCI state. Step S75 corresponds to step S4 of FIG. 3 and the above discussion of step S4 of FIG. 3 applies.

Figure 13:
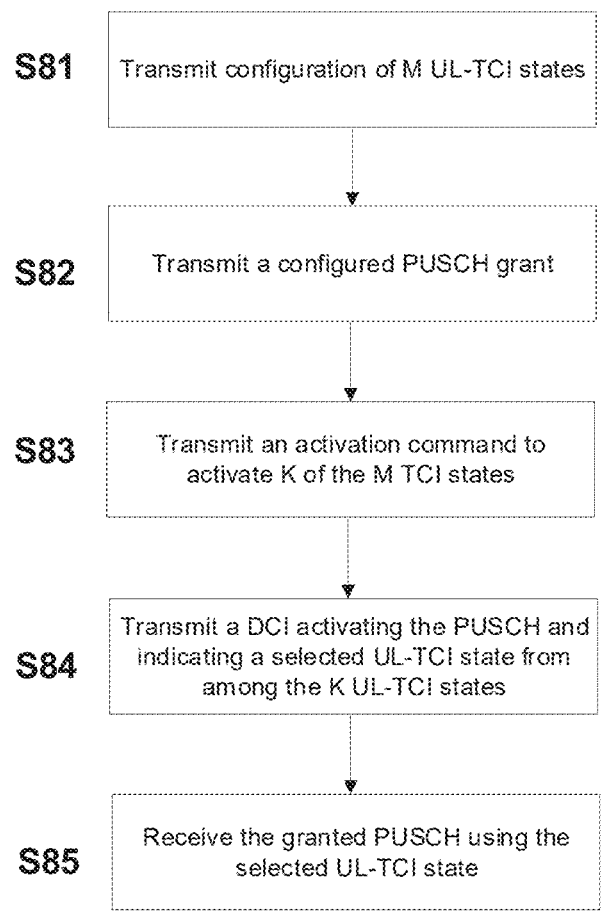
FIG. 13 shows a flowchart of the operation of the network device according to an embodiment.

FIG. 13 shows a flowchart of the operation of a network device 200 according in coordination with a terminal device 100 following the method of FIG. 12.

Steps S81 and S83 of FIG. 13 are respectively equivalent to steps S21 and S22 of FIG. 5, and repeated descriptions thereof will be omitted.

At step S82, the network device 200 transmits a configured PUSCH grant to the terminal device 100.

At step S84, the network device 200 transmits a DCI to the terminal device 100 activating the PUSCH and indicating a selected UL TCI state from among the K UL TCI states activated in step S83.

At step S85, the network device 200 receives on the granted PUSCH using the selected UL TCI state.

The above detailed discussion in relation to the flowchart of FIG. 12 applies correspondingly to this flowchart of FIG. 13, and a repeated discussion will therefore be omitted.

Figure 14:
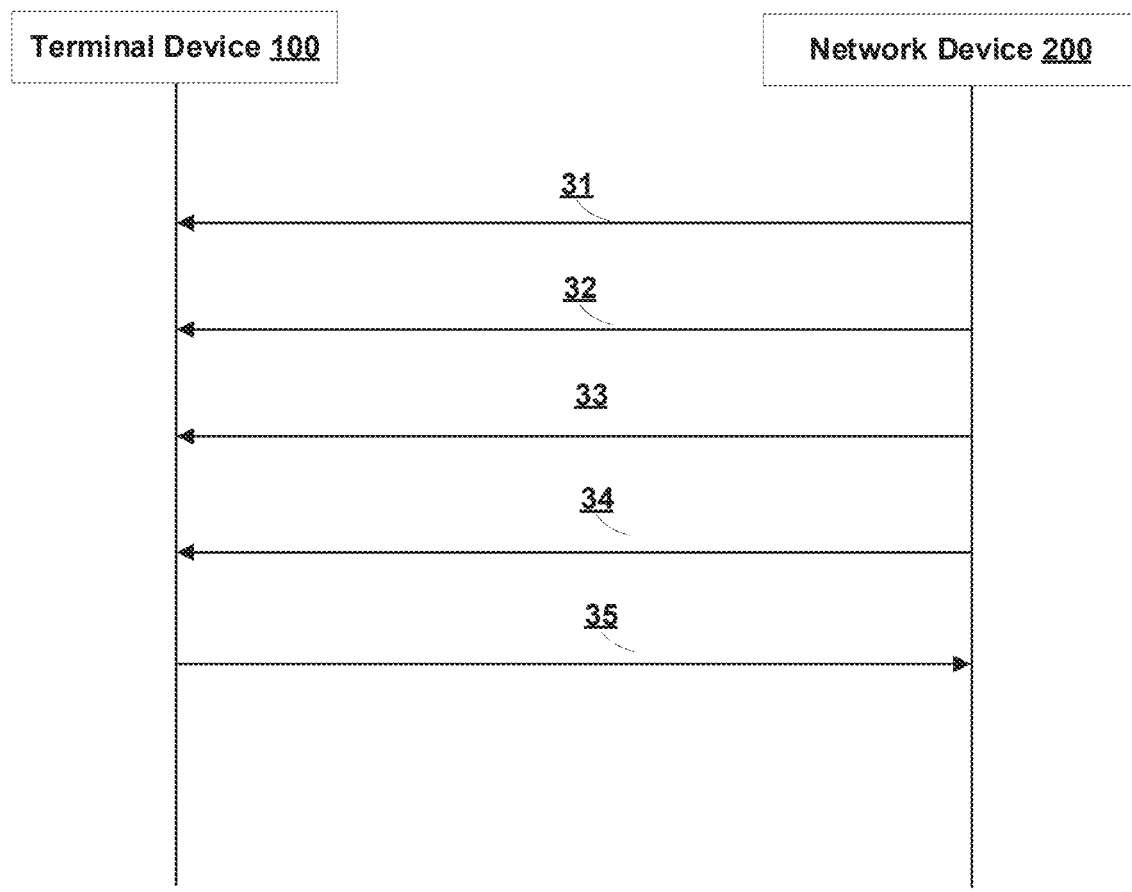
FIG. 14 shows a message flow procedure between the terminal device and network device of FIGS. 12 and 13.

FIG. 14 shows a summary of the message flow procedure between the terminal device 100 and network device 200 of this embodiment. FIG. 14 shows the following steps:
31. The network device 200 transmits a configuration of M UL TCI states to the terminal device 100;
32. The network device 200 transmits a configured PUSCH grant to the terminal device 100;
33. The network device 200 transmits an activation command to map K of the M UL TCI states to codepoints of a UL TCI field of a DCI;
34. The network device 200 transmits a DCI activating the PUSCH and indicating a selected UL TCI state from among the K UL TCI states;
35. The terminal device 100 transmits on the granted PUSCH using the selected UL TCI state It will be appreciated that the fallback method discussed above with reference to FIGS. 10-11 for dynamic scheduling (i.e. a DCI including a PUSCH grant), can correspondingly be applied for configured grants, such as those discussed with reference to FIGS. 12-14.

Figure 15:
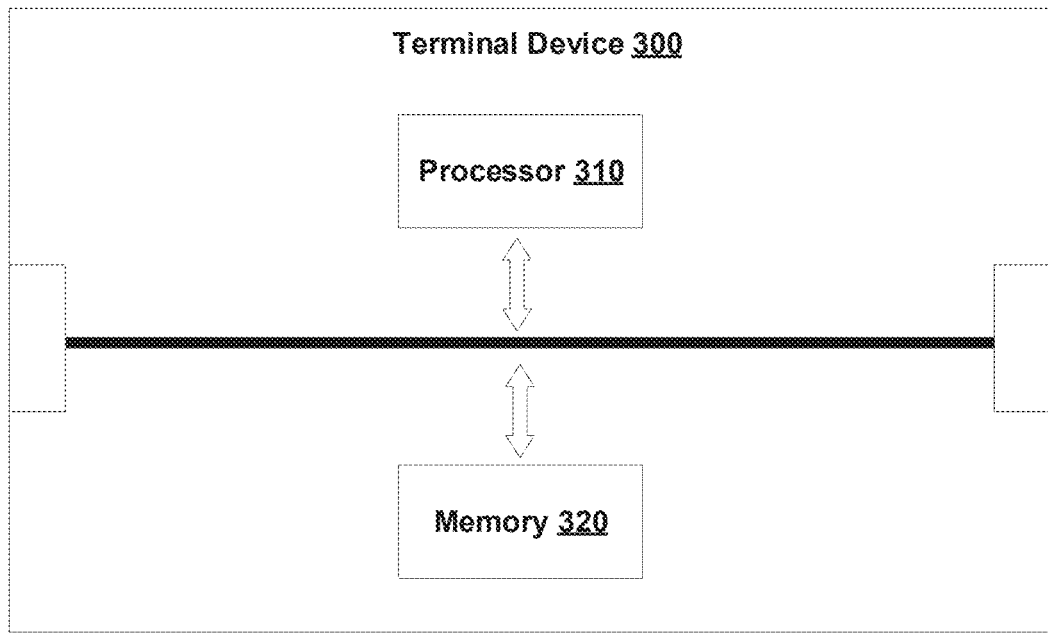
FIG. 15 shows a schematic illustration of a terminal device according to an embodiment.

FIG. 15 shows a schematic illustration of a terminal device 300 according to an embodiment. Specifically, FIG. 15 shows a schematic illustration of a terminal device 300 configured to perform any of the terminal device methods discussed herein. Such detailed descriptions thereof are omitted here for brevity.

As shown in FIG. 15, the terminal device 300 comprises a processor 310 and a memory 320. The processor 310 and the memory 320 may be connected via a bus system. The memory 320 is configured to store programs, instructions or codes. The processor 310 is configured to execute the programs, the instructions or the codes in the memory 320 so as to complete the operations in the terminal device method embodiments herein.

Hence, in embodiments, the memory 320 is configured to store a computer program capable of being run in the processor 310, and the processor 310 is configured to run the computer program to perform steps in any of the terminal device methods discussed herein.

Figure 16:
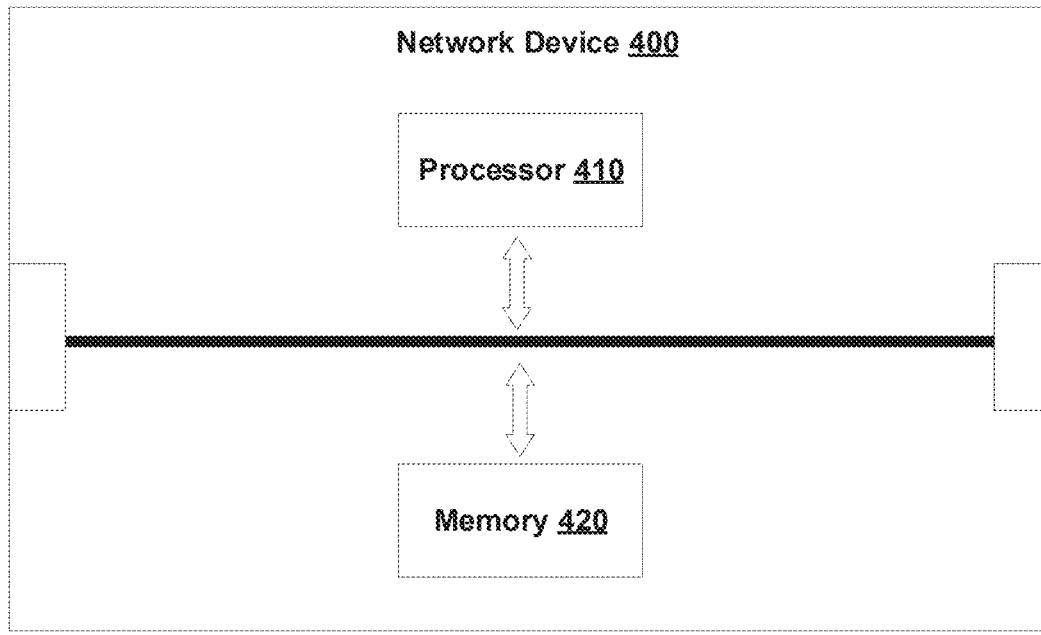
FIG. 16 shows a schematic illustration of a network device according to an embodiment.

FIG. 16 shows a schematic illustration of a network device 400 according to an embodiment. Specifically, FIG. 16 shows a schematic illustration of a network device 400 configured to perform any of the network device methods discussed herein. Such detailed descriptions thereof are omitted here for brevity.

As shown in FIG. 16, the network device 400 comprises a processor 410 and a memory 420. The processor 410 and the memory 420 may be connected via a bus system. The memory 420 is configured to store programs, instructions or codes. The processor 410 is configured to execute the programs, the instructions or the codes in the memory 420 so as to complete the operations in the network device method embodiments herein.

Hence, in embodiments, the memory 420 is configured to store a computer program capable of being run in the processor 410, and the processor 410 is configured to run the computer program to perform steps in any of the network device methods discussed herein.

While the above embodiments have been discussed in relation to a single component carrier (CC)/UL bandwidth part (BWP), embodiments of the application can also be applied for a set of CC/UL BWPs. In other words, the terminal device 100 can be configured with a set of CCs/UL BWPs for simultaneous UL TCI state activation.

For example, the terminal device may be configured with a set of UL BWPs, and the configuration information including M TCI states includes a common set of TCI states for all the UL BWPs in a CC.

The terminal device may be configured with a set of CCs, and the configuration information including M TCI states includes a common set of TCI states for all the CCs.

In some embodiments, the same K UL TCI states are mapped to codepoints of the DCI for all CCs/UL BWPs. In other words, common UL TCI states can be used for all CCs/UL BWPs.

In alternative embodiments, a different set of UL TCI states may be mapped for each CC/BWP. In this case, the mapping activation command for a particular UL TCI state includes an indicating of one or more applicable CCs for that state. In this way, the same set of UL TCI state IDs can be applied for all UL BWPs in the indicated CCs.

In some embodiments, when the terminal device 100 is configured with a set of CCs for simultaneous UL TCI state activation, the terminal device 100 may expect that UL TCI states with same UL TCI state ID configured in those CCs have the same spatial relation information configuration.

In some embodiments, the terminal device 100 is configured with a list of UL TCI states per CC. For example, for a selected UL TCI state ID, the terminal device 100 may apply the spatial relation information contained in the UL TCI state with the selected UL TCI state ID configured in one second CC to all the UL TCI states with the selected UL TCI state ID configured in other CCs in the configured CC list. In such a case, the second CC can be:
the CC with lowest (or highest) servCellIndex (Serving Cell Index) among the CCs in the configured CC list.
PCell (Primary Cell) or PSCell (Primary Secondary Cell).
the PCell or PSCell if the PCell or PSCell is included in the CC list and if PCell or PSCell is not included in the CC list, the second CC is the CC with lowest (or highest) servCellIndex among the CCs in the configured CC list.

As discussed above, the present application defines a number of methods involving the use UL TCI states for PUSCH.

In some embodiments, one UL TCI state contains one reference single (RS) to provide spatial relation information for uplink transmission and one SRS resource for reference for TPMI.

In some embodiments, when one UL TCI state contains multiple SRS resources to provide spatial relation information for uplink transmission, the terminal device 100 transmits one layer with each indicated SRS resource and the number of layers is equal to the number of SRS resources configured for spatial relation information.

In some embodiments, the UL TCI state contains uplink power control parameters, including a path loss RS, $P_0$, alpha and an index of closed loop power control.

In some embodiments, a CORESET is configured with a mode with no UL TCI state. The DCI scheduling PUSCH transmission sent in that CORESET does not carry a UL TCI state and the terminal device 100 transmits the PUSCH transmission with the same spatial domain filter used to receive the CORESET.

In some embodiments, UL TCI states can be activated for multiple simultaneous CCs/UL BWP.

Embodiments allow for a single RRC transmission to configure M (e.g. 64 or 128) UL TCI states, while a single MAC CE command is used to map K (e.g. 4 or 8) of the M UL TCI states to the codepoints of a DCI. As such, when the UL TCI state used for PUSCH transmission needs changing (e.g. because a different spatial domain filter is needed due to the terminal device 100 moving), DCI transmission can be used to change to any of the other K (e.g. 8) mapped UL TCI states. Since this DCI transmission takes place on the physical layer, no additional higher layer (e.g. MAC or RRC) signalling is needed to change between the K UL TCI states.

Furthermore, in a scenario in which none of the K (e.g. 4 or 8) UL TCI states are the desired UL TCI state, a MAC CE command can be used to change the mapping. Only if none of the M (e.g. 64 or 128) UL TCI states are the desired UL TCI state would it be necessary to perform RRC signalling to reconfigure the UL TCI states.

It can therefore be seen that this reduces the higher layer signalling overhead and resulting large latency which are associated with the use of configuring and using SRS resources for PUSCH transmission.

As is evident from the above discussion, the benefits of using the UL TCI states can be realised through the use of dynamic PUSCH transmissions, as well as configured (Type 1 and Type 2) transmissions.

Furthermore, the use of a fallback UL TCI state in which the terminal device 100 determines to transmit the PUSCH transmission with the same spatial domain filter used to receive the CORESET increases the flexibility for the network device 200 and terminal device 100 in respect of configuring and scheduling PUSCH transmissions.

As discussed above, embodiments may use first higher layer signalling (e.g. RRC signalling) to configure a set of TCI states, and second higher layer signalling (e.g. MAC signalling) to activate a sub-set of the TCI states. The second higher layer may be a higher layer than the first higher layer. Physical layer signalling (e.g. DCI) can then be used to select a specific TCI to be used to determine a transmission beam for PUSCH.

Hence, embodiments of the invention use TCI states for PUSCH transmission rather than using SRS resources as a bridge for the PUSCH transmission allows for a reduction in the higher layer signalling overhead, as well as reducing the latency which can be associated with the use of configuring and using SRS resources for PUSCH transmission.

For a UE with beam correspondence, downlink and uplink transmission generally use the same beam pair link, i.e., the best beam pair link. In the current design of NR release 15, the gNB has to use separate RRC and MAC CE signalling to configure the beams for downlink and uplink, even though the same beam is carried in those signalling message. Embodiments of the invention can overcome this.

Embodiments of the invention can also provide a computer-readable medium having computer-executable instructions to cause one or more processors of a computing device to carry out the method of any of the embodiments of the invention.

Examples of computer-readable media include both volatile and non-volatile media, removable and non-removable media, and include, but are not limited to: solid state memories; removable disks; hard disk drives; magnetic media; and optical disks. In general, the computer-readable media include any type of medium suitable for storing, encoding, or carrying a series of instructions executable by one or more computers to perform any one or more of the processes and features described herein.

It will be appreciated that the functionality of each of the components discussed can be combined in a number of ways other than those discussed in the foregoing description. For example, in some embodiments, the functionality of more than one of the discussed devices can be incorporated into a single device. In other embodiments, the functionality of at least one of the devices discussed can be split into a plurality of separate (or distributed) devices.

Conditional language such as "may", is generally used to indicate that features/steps are used in a particular embodiment, but that alternative embodiments may include alternative features, or omit such features altogether.

Furthermore, the method steps are not limited to the particular sequences described, and it will be appreciated that these can be combined in any other appropriate sequences. In some embodiments, this may result in some method steps being performed in parallel. In addition, in some embodiments, particular method steps may also be omitted altogether.

While certain embodiments have been discussed, it will be appreciated that these are used to exemplify the overall teaching of the present invention, and that various modifications can be made without departing from the scope of the invention. The scope of the invention should is to be construed in accordance with the appended claims and any equivalents thereof.

Many further variations and modifications will suggest themselves to those versed in the art upon making reference to the foregoing illustrative embodiments, which are given by way of example only, and which are not intended to limit the scope of the invention, that being determined by the appended claims.

The invention claimed is:

1. A method for transmitting on a physical uplink shared channel, PUSCH, comprising:
   receiving, by a terminal device, configuration information including M transmission configuration indication, TCI, states;
   receiving, by the terminal device, an activation command to activate K of the M TCI states;
   receiving, by the terminal device, downlink control information, DCI, to schedule a PUSCH transmission, the DCI indicating a selected TCI state from among the K TCI states;
   determining, by the terminal device, a spatial domain transmission filter using the selected TCI state; and
   transmitting, by the terminal device, on the PUSCH according to the determined spatial domain transmission filter;
   wherein a TCI state for PUSCH is associated with spatial relation information, power control parameters, and a path loss reference signal, and
   the TCI state comprises an uplink power parameter, and the terminal device transmits on the PUSCH using the uplink power indicated in the selected TCI state.

2. The method of claim 1, wherein the terminal device is configured with a list of up to M TCI state configurations through a higher layer parameter for transmission of PUSCH, and maximum values of M and K are determined by capability of the terminal device.

3. The method of claim 1, wherein each TCI state comprises at least one of the following configuration parameters: a downlink reference signal resource, an uplink reference signal resource, or uplink power control parameters.

4. The method of claim 3, wherein the uplink power control parameter comprises a path loss reference signal, a value of a target received power level, a value of a power adjustment factor and an index of closed loop power control.

5. The method of claim 1, wherein the selected TCI state comprises a reference signal resource configured as spatial relation information, and
wherein the terminal device transmits on the PUSCH using a spatial domain transmit filter that is the same as a spatial domain filter used to transmit or receive the reference signal resource configured as the spatial relation information in the selected TCI state.

6. The method of claim 5, wherein the reference signal resource comprises a downlink reference signal resource or an uplink reference signal resource.

7. The method of claim 6, wherein the downlink reference signal resource comprises a channel state information reference signal, CSI-RS, resource or a synchronization signal/physical broadcast channel SS/PBCH block to provide spatial relation information for the spatial domain transmission filter.

8. The method of claim 6, wherein the uplink reference signal resource comprises a SRS resource or a SRS resource index to provide spatial relation information for the spatial domain transmission filter.

9. The method of claim 1, wherein the configuration information including the M TCI states is received as a joint state pool with TCI states used to decode a physical downlink shared channel, PDSCH transmission.

10. The method of claim 1, wherein the terminal device is configured with a set of UL bandwidth parts, BWPs, and the configuration information includes a common set of TCI states for all the UL BWPs; or,
wherein the terminal device is configured with a set of component carriers, CCs, and the configuration information includes a common set of TCI states for all the CCs.

11. A terminal device for transmitting on a physical uplink shared channel, PUSCH, comprising:
a transceiver to:
receive configuration information including M transmission configuration indication, TCI, states;
receive an activation command to activate K of the M TCI states, and
receive downlink control information, DCI, to schedule a PUSCH transmission, the DCI indicating a selected TCI state from among the K TCI states; and
a processor to:
determine a spatial domain transmission filter using the selected TCI state; and
control the communication unit to transmit on the PUSCH according to the determined spatial domain transmission filter;
wherein a TCI state for PUSCH is associated with spatial relation information, power control parameters, and a path loss reference signal, and
the TCI state comprises an uplink power parameter, and the terminal device transmits on the PUSCH using the uplink power indicated in the selected TCI state.

12. The terminal device of claim 11, wherein the selected TCI state comprises a reference signal resource configured as spatial relation information, and
wherein the processor is configured to control the communication unit to transmit on the PUSCH using a spatial domain transmit filter that is the same as a spatial domain filter used to transmit or receive the reference signal resource configured as the spatial relation information in the selected TCI state.

13. The terminal device of claim 12, wherein the reference signal resource comprises a downlink reference signal resource or an uplink reference signal resource.

14. The terminal device of claim 13, wherein the downlink reference signal resource comprises a channel state information reference signal, CSI-RS, resource or a synchronization signal/physical broadcast channel SS/PBCH block to provide spatial relation information for the spatial domain transmission filter.

15. A network device for initiating transmission by a terminal device on a physical uplink shared channel, PUSCH, the network device comprising:
a transceiver; and
a processor to:
control the transceiver to transmit configuration information including M transmission configuration indication, TCI, states;
control the transceiver to transmit an activation command to activate K of the M TCI states; and
control the transceiver to transmit downlink control information, DCI, to schedule a PUSCH transmission, the DCI indicating a selected TCI state from among the K TCI states, the selected TCI state indicating a spatial domain transmission filter to be used for the scheduled PUSCH transmission,
wherein the transceiver is configured to receive the scheduled PUSCH transmission;
wherein a TCI state for PUSCH is associated with spatial relation information, power control parameters, and a path loss reference signal, and
the TCI state comprises an uplink power parameter, and the terminal device transmits on the PUSCH using the uplink power indicated in the selected TCI state.

16. The network device of claim 15, wherein the selected TCI state comprises a reference signal resource configured as spatial relation information.

17. The network device of claim 16, wherein the reference signal resource comprises a downlink reference signal resource or an uplink reference signal resource.

18. The network device of claim 17, wherein the downlink reference signal resource comprises a channel state information reference signal, CSI-RS, resource or a synchronization signal/physical broadcast channel SS/PBCH block to provide spatial relation information for the spatial domain transmission filter.

* * * * *